US012435544B2

(12) United States Patent
Fassbender et al.

(10) Patent No.: US 12,435,544 B2
(45) Date of Patent: Oct. 7, 2025

(54) MAGNETICALLY CODED LOCK

(71) Applicant: DIRAK Dieter Ramsauer Konstruktionselemente GmbH, Ennepetal (DE)

(72) Inventors: Noah Fassbender, Sprockhövel (DE); Peter Höschler, Velbert (DE)

(73) Assignee: DIRAK Dieter Ramsauer Konstruktionselemente GmbH, Ennepetal (DE)

( * ) Notice: Subject to any disclaimer, the term of this patent is extended or adjusted under 35 U.S.C. 154(b) by 0 days.

(21) Appl. No.: 18/879,475

(22) PCT Filed: Jun. 27, 2023

(86) PCT No.: PCT/EP2023/067393
§ 371 (c)(1),
(2) Date: Dec. 27, 2024

(87) PCT Pub. No.: WO2024/003010
PCT Pub. Date: Jan. 4, 2024

(65) Prior Publication Data

US 2025/0257588 A1 Aug. 14, 2025

(30) Foreign Application Priority Data

Jun. 30, 2022 (DE) ..................... 10 2022 116 339.3
Feb. 17, 2023 (DE) ..................... 10 2023 103 954.7

(51) Int. Cl.
*E05B 47/00* (2006.01)
*E05B 35/00* (2006.01)
*E05C 3/04* (2006.01)

(52) U.S. Cl.
CPC ........ *E05B 47/0044* (2013.01); *E05B 35/008* (2013.01); *E05C 3/042* (2013.01)

(58) Field of Classification Search
CPC .. E05B 47/00; E05B 47/0043; E05B 47/0044; E05B 35/008; E05C 3/042; Y10T 70/7904; Y10T 70/7057
(Continued)

(56) References Cited

U.S. PATENT DOCUMENTS 3,518,855 A 7/1970 Kiyoyasu
3,566,637 A * 3/1971 Hallmann ........... E05B 47/0044 70/276
(Continued)

FOREIGN PATENT DOCUMENTS

CN 202731459 U 2/2013
CN 104389462 A * 3/2015
(Continued)

*Primary Examiner* — Suzanne L Barrett
(74) *Attorney, Agent, or Firm* — The Webb Law Firm

(57) ABSTRACT

A lock, in particular sash lock, with a lock housing and with a lock core rotatably mounted in the lock housing. The lock core, at a first end accessible from a front side of the lock, is formed for torque-transmitting attachment of a key, in particular a socket key. The lock has blocking means, which, when the key is removed, block rotation of the lock core in the lock housing between an open position and a closed position, and wherein the blocking means are configured to release the rotation of the lock core in the lock housing between the open position and the closed position when a key, in particular a socket key, with a predetermined magnet arrangement is mounted on the first end of the lock core. The invention further relates to a key and a lock system.

18 Claims, 19 Drawing Sheets

(58) Field of Classification Search
USPC .................................................... 70/276, 413
See application file for complete search history.

(56) References Cited

U.S. PATENT DOCUMENTS

| | | | | | |
|---|---|---|---|---|---|
| 3,602,020 | A * | 8/1971 | Kajita | E05B 37/00 | 70/276 |
| 3,654,782 | A * | 4/1972 | Heimann | E05B 47/0044 | 70/276 |
| 3,779,052 | A * | 12/1973 | Deitch | E05B 47/0038 | 70/276 |
| 3,782,147 | A * | 1/1974 | Hallmann | E05B 47/0042 | 70/276 |
| 3,837,195 | A * | 9/1974 | Pelto | E05B 47/0038 | 70/276 |
| 3,967,479 | A * | 7/1976 | Vick | E05B 47/0041 | 70/276 |
| 3,974,669 | A * | 8/1976 | Stackhouse | E05B 47/0041 | 70/20 |
| 4,022,038 | A * | 5/1977 | Miller | E05B 47/0045 | 70/276 |
| 4,307,589 | A * | 12/1981 | Kajita | E05B 47/0041 | 70/276 |
| 9,249,600 | B2 * | 2/2016 | Oliana | E05C 3/042 | |
| 10,125,521 | B2 * | 11/2018 | Ciecha | E05B 47/0044 | |
| 2012/0131967 | A1 * | 5/2012 | Sanchez | E05B 47/0038 | 70/276 |
| 2014/0230500 | A1 * | 8/2014 | Oliana | E05B 15/14 | 70/344 |
| 2016/0290010 | A1 | 10/2016 | Ciecha | | |

FOREIGN PATENT DOCUMENTS

| | | | | | |
|---|---|---|---|---|---|
| DE | 102023130803 | A1 * | 5/2025 | | |
| EP | 2767656 | A1 | 8/2014 | | |
| EP | 3252324 | A1 * | 12/2017 | B60B 3/165 | |
| FR | 2139211 | A5 | 1/1973 | | |
| FR | 2909650 | A1 | 6/2008 | | |
| GB | 2521629 | A | 7/2015 | | |
| JP | S58145202 | U | 9/1983 | | |
| JP | 2000320215 | A | 11/2000 | | |
| JP | 2004308272 | A | 11/2004 | | |
| JP | 2006514185 | A | 4/2006 | | |
| LU | 102220 | B1 | 1/2022 | | |

* cited by examiner

MAGNETICALLY CODED LOCK

CROSS-REFERENCE TO RELATED APPLICATIONS

This application is the United States national phase of International Application No. PCT/EP2023/067393 filed Jun. 27, 2023, and claims priority to German Patent Application No. 10 2022 116 339.3, filed Jun. 30, 2022, and German Patent Application No. 10 2023 103 954.7, filed Feb. 17, 2023, the disclosures of which are hereby incorporated by reference in their entireties.

BACKGROUND OF THE INVENTION

Field of the Invention

The present invention relates to a lock, in particular a sash lock, with a lock housing, with a lock core rotatably mounted in the lock housing, wherein the lock core, at a first end accessible from a front side of the lock, is formed for torque-transmitting attachment of a key, in particular a socket key, and wherein the lock has blocking means, which, when the key is removed, block rotation of the lock core in the lock housing between an open position and a closed position. The invention also relates to a key, in particular a socket key, for such a lock and to a lock system, in particular a sash lock system, with such a lock and such a key.

Description of Related Art

Locks such as sash locks and the like are used in the state of the art as industrial hardware components, for example for locking thin-walled sheet metal doors. Simple sash locks have a lock contour on the lock core, for example in the form of a square end or a square recess, for attaching a key with a corresponding key contour, for example a socket key with a square hollow contour or square contour, so that high torques can be transmitted from the socket key to the lock core and thus to the rotary tongue. In this way, the often quite high frictional forces between the rotating tongue and a blocking surface of a frame surrounding the sheet metal door, which blocking surface is engaged behind by the rotating tongue, can be overcome when opening or closing the sash lock. The disadvantage of such sash locks is the low level of security against unauthorized operation, as such sash locks can be opened or closed quite easily even without a suitable key, for example with pliers.

Furthermore, sash locks are known from the state of the art into which or into the lock core of which a conventional cylinder lock is integrated. Such a conventional cylinder lock has a lock core with a key channel, wherein movable blocking elements such as blocking plates (for plate cylinders), blocking discs (for disc cylinders) or blocking pins (for pin cylinders) block the rotation of the lock core in the lock housing if the blocking elements are not mechanically moved into a certain position by the key contour of a suitable key inserted into the key channel. This provides a high level of security against unauthorized operation. However, conventional cylinder locks are more sensitive than socket key locks and are therefore less robust under adverse environmental conditions or require lock covers to prevent dust and dirt from contaminating the filigree key channel or the movable blocking elements, which complicates the handling of the locks.

In addition, only very low torques can be transmitted with standard cylinder keys due to their low leverage and the delicate mechanics of conventional cylinder locks, which limits their use with sash locks, some of which require high torques to open and close, as described above.

In order to transmit high torques despite the use of a conventional cylinder lock, it is also known to provide a separate rotary handle for opening or closing the sash lock in addition to the cylinder lock for unlocking. However, such sash locks have the disadvantage of increased operating complexity and require a significantly larger installation space.

SUMMARY OF THE INVENTION

Against this background, the present invention is based on the object of proposing a lock, in particular a sash lock, a key for such a lock and a lock system which overcomes at least one or some of the disadvantages of the prior art described above. The aforementioned object is solved according to the invention by a lock, in particular a sash lock, with a lock housing and with a lock core rotatably mounted in the lock housing, wherein the lock core, at a first end accessible from a front side of the lock, is formed for the torque-transmitting attachment of a key, in particular a socket key, and wherein the lock has blocking means, which, when the key is removed, block rotation of the lock core in the lock housing between an open position and a closed position, wherein the blocking means are configured to release the rotation of the lock core in the lock housing between the open position and the closed position when a key, in particular a socket key, with a predetermined magnet arrangement is mounted on the first end of the lock core.

In this way, a robust and compact lock, in particular a sash lock, is provided, to whose lock core preferably high or higher torques can be transmitted by mounting and turning a key and which at the same time offers a certain basic security against opening or closing without a suitable key.

In particular, the lock can be a sash lock. In this case, the lock core preferably has a rotating tongue at a second end. In particular, the rotating tongue may be detachably connected to the lock core. The lock may then preferably be used to transmit high or higher torques to the rotating tongue, for example to lock it behind a counter surface or to move it out of a locked position behind a counter surface.

It is also conceivable that the lock is a rod lock, for example a door rod lock. In this case, a second end of the lock core is preferably coupled to one or more rods in such a way that a rotary movement of the lock core is converted into a pushing movement of the one or more rods. For example, the second end of the lock core may carry a gearwheel that meshes with a corresponding section, for example a rack section, of a rod of the rod lock.

It is also conceivable that the lock is an axial lock. In this case, for example, a contour that can be moved in an axial direction may be provided at a second end of the lock core, which contour can be moved into a corresponding contour, for example on a frame, for locking and/or out of the contour for unlocking. It is also conceivable that the second end of the lock core has a contour, for example a screw or bayonet contour, which can be turned into a corresponding contour, for example on a frame, for locking and/or out of the contour for unlocking. Combinations of these designs are also conceivable.

It is also conceivable that the lock is formed in the shape of a profile cylinder. For this purpose, the lock housing may in particular have the shape of a profile cylinder. This allows the lock to be used instead of a conventional cylinder lock, for example instead of a plate cylinder, disc cylinder or pin cylinder. In particular, the lock can be easily installed in locking devices for profile cylinders in this way. Such a lock in the form of a profile cylinder preferably has a locking lug that is non-rotatably connected to the lock core.

Due to the fact that the blocking means are configured to release the rotation of the lock core in the lock housing between the open position and the closed position when a key with a predetermined magnet arrangement is attached on the first end of the lock core, a magnetic unlocking function is provided, so that the key contour and the corresponding lock contour of the lock core may be optimized in geometric and mechanical terms preferably for the transmission of high torques, for example with a more robust design.

In contrast, in conventional cylinder lock systems, the shape of the cylinder lock key and the key channel of the cylinder lock that receives the key are mechanically complex in order to achieve a mechanical unlocking function, which means that only very low torques can be transmitted.

The lock core is formed, at a first end accessible from a front side of the lock, for the torque-transmitting attachment of a key. In this way, the lock core can be actuated by attachment of a suitable key when the blocking means release the rotation of the lock core.

Preferably, the first end of the lock core is in particular configured in such a way that a suitable key can be attached onto the first end of the lock core in a form-fit manner, so that torque transmission from the key to the lock core is made possible in relation to the axis of rotation of the lock core. In this way, the lock core can be actuated by the key. Attaching the key can also involve inserting a projecting part of a key contour of the key, for example a polygonal contour, into a corresponding recess at the first end of the lock core.

The blocking means are designed in such a way that they block rotation of the lock core in the lock housing between an open position and a closed position when the key is removed. The blocking means may, for example, be designed to block rotation of the lock core in the lock housing from the open position to the closed position when the key is removed. Additionally or alternatively, the blocking means may, for example, be designed to block the rotation of the lock core in the lock housing from the closed position to the open position when the key is removed. It is not necessary, although it is conceivable, that the blocking means prevent any rotation of the lock core in the lock housing when the key is removed. In particular, a design is conceivable in which the lock core can be moved, for example, from an intermediate position between the open position and the closed position into the open position or into the closed position even when the key is removed and the blocking means only engage when the open and/or closed position is reached.

The blocking means are designed to release the rotation of the lock core in the lock housing between the open position and the closed position when a key with a predetermined magnet arrangement is attached onto the first end of the lock core. The blocking means are therefore in particular configured for magnetic interaction with the predetermined magnet arrangement, which magnetic interaction causes the rotation of the lock core to be released.

By adapting the blocking means to a predetermined magnetic arrangement of a key, the lock is magnetically coded. Actuation of the lock therefore requires the use of a suitable key with the specified magnetic arrangement, while actuation of the lock with a key without a magnetic arrangement or with a magnetic arrangement that differs from the predetermined magnetic arrangement is only possible to a limited extent, for example only in intermediate positions between the open position and the closed position, or not at all. The predetermined magnet arrangement therefore determines the design of the lock. The magnet arrangement itself is not part of the lock. However, the blocking means of the lock are specifically adapted to the predetermined magnet arrangement, so that attachment of a suitable key with the predetermined magnet arrangement causes the blocking means to release the rotation of the lock core.

The aforementioned object is further solved according to the invention by a key, preferably a socket key, in particular for the aforementioned lock or an embodiment thereof. The key has a handle part and an attachment part, which may also be formed in one piece. The attachment part has a key contour, in particular a polygonal contour, for torque-transmitting attachment to a lock core of a lock, in particular the lock described above or an embodiment thereof. Furthermore, the key has a magnet arrangement on the attachment part, in particular for magnetic interaction with blocking means of a lock, in particular the lock described above or an embodiment thereof.

The key is in particular a socket key, for example a polygonal key. In particular, the key may have an external and/or internal contour, for example a polygonal contour, with which the key can be attached onto a corresponding mating contour, in particular the internal and/or external contour, of a lock. An example of a socket key with an external contour is a key with an external square. An example of a socket key with an internal contour is a key with an internal square. It is also conceivable that a key has both an external and an internal contour.

Furthermore, the aforementioned object is solved according to the invention by a lock system, in particular a sash lock system, with the aforementioned lock or an embodiment thereof and with a key matching the lock, in particular the aforementioned key or an embodiment thereof.

The key of the lock system is a key that matches the lock of the lock system. For this purpose, the key and the lock are adapted to each other in particular in such a way that the lock core at the first end is formed for torque-transmitting attachment of the key and that the blocking means of the sash lock are configured to release the rotation of the lock core in the lock housing between the open position and the closed position when the key is attached onto the first end of the lock core. In particular, the magnetic arrangement of the key is the predetermined magnetic arrangement for which the blocking means are configured to release the rotation of the lock core in the lock housing between the open position and the closed position when a key with this predetermined magnetic arrangement is attached onto the first end of the lock core.

Various embodiments of the lock, the key and the lock system are described below, wherein the individual embodiments apply independently of one another to the lock, the key and the lock system. Furthermore, the individual embodiments may be combined with each other as desired.

In one embodiment, the lock core, at the first end, has a lock contour, in particular a polygonal contour, for the torque-transmitting attachment of a key, preferably a socket key, in particular a polygonal key. A lock contour of this type enables high or higher torques to be transmitted when a socket key with a corresponding key contour is attached. In addition, such lock contours for socket keys are very robust compared to the key channels of conventional cylinder lock systems, especially under adverse environmental conditions such as dusty environments. In particular, the lock contour may have one or more recesses and/or one or more protrusions.

The lock contour of the lock core is intended for torque-transmitting attachment of a socket key. Accordingly, the lock contour is designed in particular such that the lock contour forms a form-fit with the key contour for torque transmission when an associated key is attached.

The lock contour may, for example, have a recess, for example a polygonal recess, to receive a corresponding projection, for example a polygonal projection, of the key contour of an associated key. Furthermore, the lock contour may, for example, have a protrusion, for example a polygonal protrusion, for reception in a corresponding recess, for example a polygonal recess, of the key contour of an associated key.

The lock core may also have a contour part with a lock contour, in particular an outer contour, wherein the contour part may project laterally beyond the lock housing at the first end, for example. The key may accordingly have a key contour, in particular an inner contour, adapted to the lock contour.

Preferably, the contour part is flat and is delimited by an outer contour on the edge, which forms the lock contour. This enables a very flat design of the lock contour. In this way, for example, a user may be prevented from getting caught on a protruding part of the lock contour. There are also fewer points of attack for tampering in this way.

Accordingly, the key may preferably have an inner contour that defines a flat area in which, for example, the magnet arrangement or one or more magnets thereof may be arranged. In this way, a robust key with a flat design can be provided.

The lock contour, for example the outer contour, and/or the key contour, for example the inner contour, may also be rounded, preferably in the shape of an oval, for example. This improves the tamper resistance of the lock, as the rounded shape of the lock contour provides fewer points of attack for foreign tools, such as pliers.

The lock contour and/or the key contour are preferably asymmetrical in such a way that the lock contour allows a key with the corresponding key contour to be attached in only one orientation.

In one embodiment, the predetermined magnet arrangement comprises a predetermined number of magnets, each having a predetermined position. In a further embodiment, the predetermined magnet arrangement comprises a predetermined number of magnets, each having a predetermined position and a predetermined pole orientation. Preferably, the magnet arrangement comprises two or more magnets, each with a predetermined position and optionally a predetermined pole orientation. Further preferably, at least two magnets of the magnet arrangement have different pole orientations, preferably pole orientations that are antiparallel to each other. Furthermore, two magnets of the magnet arrangement may have respective pole orientations that are aligned at an angle to each other, for example at a right angle. In a corresponding embodiment of the key, the magnet arrangement comprises one or more magnets arranged at a respective position, wherein preferably at least two magnets have different pole orientations, particularly preferably pole orientations aligned antiparallel to one another.

The security of the lock against unauthorized operation can be improved by specifying a certain number of magnets, each having a predetermined position and optionally a predetermined pole orientation, for the magnet arrangement. In particular, different magnet arrangements can be realized in this way for keys having the same geometry, so that a key can be magnetically coded for an associated lock, so that the associated lock can be unlocked with the key in question, but not a lock that requires a differently magnetically coded key.

In one embodiment, the blocking means comprise a blocking element which is mounted displaceably between a blocking position, in which the blocking element blocks the rotation of the lock core in the lock housing between the open position and the closed position, and a release position, in which the blocking element releases the rotation of the lock core in the lock housing between the open position and the closed position. In this way, the rotation of the lock core can be easily and reliably blocked or released as required. Preferably, the blocking element is designed to interact in a form-fitting manner with the lock housing and the lock core in the closed position in such a way that rotation of the lock core in the lock housing is blocked.

Preferably, the blocking means comprise a plurality of blocking elements which are mounted displaceably between a respective blocking position, in which the blocking elements block the rotation of the lock core in the lock housing between the open position and the closed position, and a respective release position, in which the blocking elements release the rotation of the lock core in the lock housing between the open position and the closed position.

The one or more blocking elements may, for example, be mounted axially and/or radially displaceably in relation to the axis of rotation of the lock core.

Preferably, one or more axially displaceable blocking elements as well as one or more radially displaceable blocking elements are provided. In this way, good vibration resistance of the locking mechanism and increased security against tampering are achieved.

In one embodiment, the lock core has a receptacle in which the blocking element is displaceably mounted. In the case of several blocking elements, the lock core preferably has several receptacles in each of which a blocking element is displaceably mounted. In this way, a particularly compact design of the lock can be achieved. The receptacle may, for example, be formed by a blind bore or through bore on the lock core or by a peripheral receptacle that is at least partially formed by the lock core.

In a further embodiment, the lock housing has a receptacle in which the blocking element is displaceably mounted. In the case of several blocking elements, the lock housing preferably has several receptacles in each of which a blocking element is displaceably mounted. In this way, a particularly robust design of the lock can be achieved.

Furthermore, a blocking element may also be displaceably mounted in a receptacle formed by both the lock core and the lock housing. This is conceivable for multi-part blocking elements, for example.

If one or more receptacles are arranged in the lock housing, one or more associated recesses are preferably provided in the lock core, into which the blocking elements plunge in the blocking position and thus block a rotary movement between the lock core and the lock housing. If one or more receptacles are arranged in the lock core, one or more associated recesses are preferably provided in the lock housing, into which the blocking elements engage in the blocking position and thus block a rotary movement between the lock core and the lock housing.

In one embodiment, the blocking means comprise a plurality of blocking elements, which blocking elements are mounted in respective receptacles in the lock housing and/or in the lock core, the receptacles being arranged around the axis of rotation of the lock core, and which blocking elements, in the blocking position, engage in a respective associated recess in the lock core and/or locking housing.

Preferably, at least two, preferably all, of the receptacles and/or associated recesses arranged around the axis of rotation of the lock core have different distances from the axis of rotation of the lock core. In this way, it is possible to prevent a blocking element arranged in a receptacle from engaging into a recess that is different from the recess assigned to the receptacle and from blocking the rotational movement between the lock core and the lock housing when the lock core is rotated.

The blocking means, in particular the one or more blocking elements, are preferably arranged at a distance from the lock contour, preferably such that the blocking means, in particular the one or more blocking elements, have no direct contact with an attached key when the key is attached onto the first end of the lock core. Preferably, the one or more receptacles and/or associated recesses are spaced apart from the lock contour.

In one embodiment, the lock has a retaining element which is configured to retain, when the key is removed, the blocking element in the closed position by magnetic interaction, in particular between the retaining element and the blocking element. This increases the vibration resistance of the lock so that the blocking elements are held securely in the closed position when the key is removed, even in the event of mechanical vibrations or shaking, thus preventing the lock from being opened or closed when the key is removed. In the case of several blocking elements, the retaining element can preferably be designed to retain, when the key is removed, the several blocking elements in the closed position by means of magnetic interaction between the retaining element and the blocking element.

The magnetic interaction between the retaining element and the blocking element or the multiple blocking elements is preferably a magnetically attractive interaction. However, it is also conceivable that the magnetic interaction between the retaining element and the blocking element or the multiple blocking elements is a magnetically repelling interaction.

For example, the blocking element may be a magnet or comprise a magnet and the retaining element may also be a magnet or consist of a ferromagnetic material, for example in the form of a ferromagnetic metal plate, such as a steel plate, or a ferromagnetic pin, such as a steel pin.

In one embodiment, the blocking element is configured to be moved into the release position when a key with the predetermined magnet arrangement is attached onto the first end of the lock core, namely by magnetic interaction, in particular magnetic repulsion, between the blocking element and the magnet arrangement. In the case of several blocking elements, the blocking elements are preferably configured to be moved into the release position when a key with the predetermined magnet arrangement is attached onto the first end of the lock core, namely by magnetic interaction, in particular magnetic repulsion, between the blocking elements and the magnet arrangement. Unlocking by means of magnetic repulsion between the magnet arrangement and the one or more blocking elements enables a reliable and smooth-running unlocking mechanism.

Preferably, the magnet arrangement has an associated magnet for each blocking element, particularly preferably an associated respective magnet.

In one embodiment, the blocking element is a magnet or comprises a magnet. In the case of several blocking elements, at least one, preferably several, of the blocking elements are magnets or comprise a magnet. In this way, the blocking element may, for example, be held in the closed position by magnetically attracting interaction with a retaining element provided when the key is removed. Furthermore, the blocking element may be moved into the release position in this way, for example by magnetically repelling interaction with a magnet of the magnet arrangement of a key, when the key is attached onto the first end of the lock core.

In particular, the blocking element may have a magnet and a sleeve, especially a metal sleeve, surrounding the magnet. In this way, greater shear force resistance of the blocking element is achieved when blocking rotation of the lock core in the lock housing, which increases the durability of the lock.

In particular, the blocking element may also have a multi-part design and comprise, for example, a magnet and a steel pin magnetically connected to it, whereby the steel pin causes, in a blocking position, the rotation of the lock core in the lock housing. In this way, the durability of the lock can also be increased.

In one embodiment, the lock has an abutment surface arrangement for abutment of the predetermined magnet arrangement and the blocking means are arranged and configured in such a way that the blocking means release the rotation of the lock core in the lock housing between the open position and the closed position when the predetermined magnet arrangement comes into contact with the abutment surface arrangement, in particular in a predetermined orientation. This facilitates handling of the lock, as the user can check that the key is correctly seated on the lock by means of the abutment with the abutment surface arrangement. In addition, the distance between the magnet arrangement and the blocking means can be kept as small as possible by placing the magnet arrangement against the abutment surface arrangement in order to increase the magnetic interaction between the magnet arrangement and the blocking means.

In particular, the abutment surface arrangement may have one or more abutment surfaces that are provided for the abutment of one or more magnets of the magnet arrangement. The abutment surface arrangement is arranged in particular in such a way that the magnet arrangement comes into abutment with the abutment surface arrangement when the key is mounted. The one or more abutment surfaces of the abutment surface arrangement can be arranged in particular at the first end of the lock core and/or on the lock housing.

If the blocking means comprise one or more blocking elements, the blocking elements are preferably arranged in the area of the one or more abutment surfaces of the abutment surface arrangement, so that when the magnet arrangement is in contact, a magnetic interaction occurs between the magnet arrangement and the blocking elements, which moves the blocking elements into the release position.

In one embodiment, the abutment surface arrangement is arranged completely or at least partially separately from the lock contour, for example offset radially outwards or inwards in relation to the axis of rotation of the lock core. In a corresponding embodiment of the key, the magnet arrangement is arranged completely or at least partially outside the key contour. In this way, the unlocking function can be structurally separated from the torque transmission function, whereby a more robust design of the lock and the key can be achieved.

In one embodiment, the abutment surface arrangement is arranged at least partially on the lock contour, preferably on an inner surface of a receptacle of the lock contour. In a corresponding embodiment of the key, the magnet arrangement is arranged at least partially on the key contour. In this way, the lock can be better protected against manipulation by magnets held from the outside.

In one embodiment, the lock core is formed as multiple parts and has a core part arranged in the inner channel of the lock housing and a contour part with the lock contour, the core part and the contour part being connected to one other in a rotationally fixed manner. For this purpose, the core part and the contour part may, for example, have corresponding contours with which the core part and the contour part engage in a form-fitting manner with one another. The core part and the contour part may be held together by a pin or a screw, for example by means of a screw that runs through the core part and is screwed into an inner contour of the contour part.

The multiple-parts design of the lock core, in particular with core part and contour part, makes it possible, for example, to provide the lock with a desired lock contour as required by selecting a suitable contour part from several different contour parts.

In one embodiment, the key has a wall thickness of at least 4 mm. Preferably, the key contour of the key has a wall thickness of at least 4 mm. In this way, higher torque transmissions are possible with the key. Preferably, the lock contour is designed accordingly for mounting a key contour with a wall thickness of at least 4 mm.

The key is preferably at least partially made of metal, which enables high torque transmissions. The handle part of the key preferably extends at least 2 cm, more preferably at least 3 cm, particularly preferably at least 4 cm, transversely to the axis of rotation of the key intended for actuating the key. In this way, it is easier for the user to transmit higher torques to the key and thus, if the key is mounted onto a lock core of a lock, to the lock core.

BRIEF DESCRIPTION OF THE DRAWINGS

Further features and advantages of the lock, the key and the lock system emerge from the following description of exemplary embodiments, with reference being made to the attached drawing.

In the drawing

DESCRIPTION OF THE INVENTION

Figure 1B:
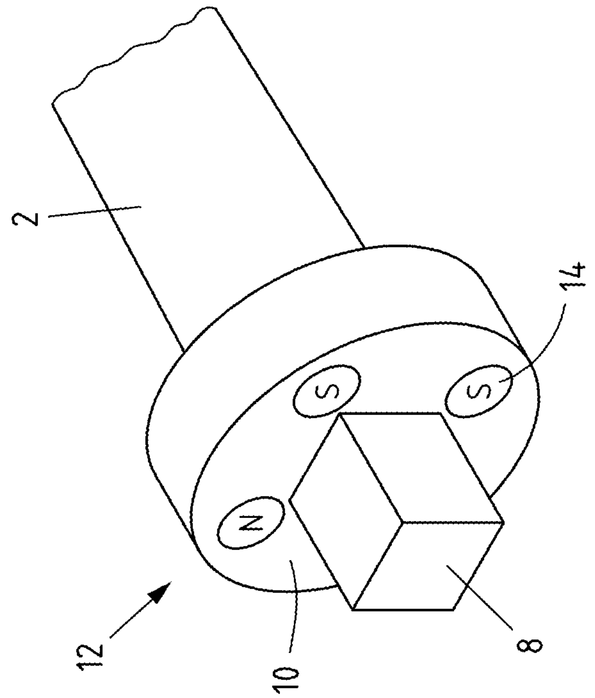
FIGS. 1*a-g* show a first exemplary embodiment of the lock, the key and the lock system.
Figure 1A:
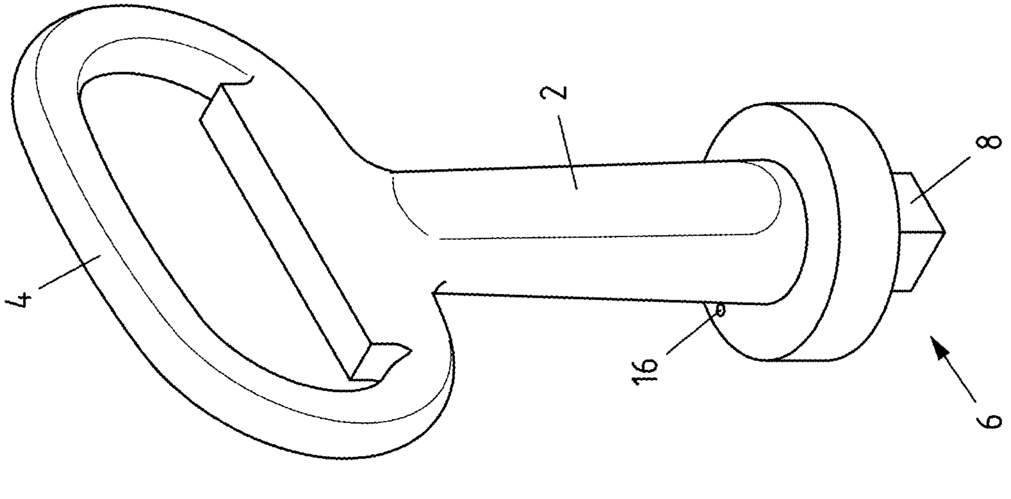
Figure 1D:
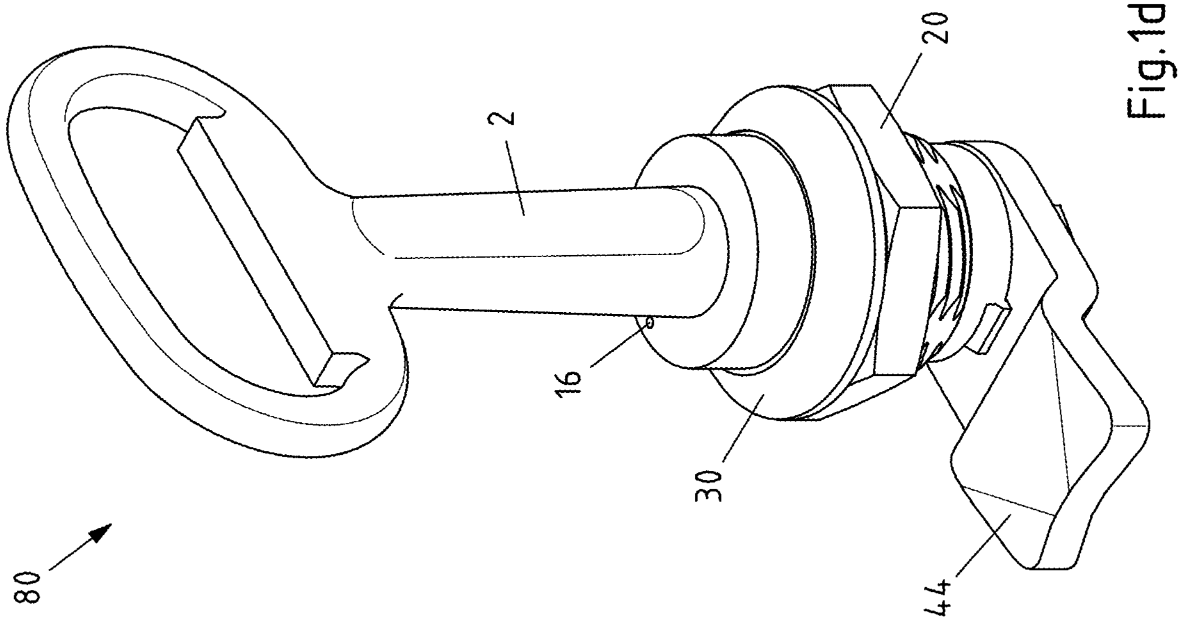
Figure 1C:
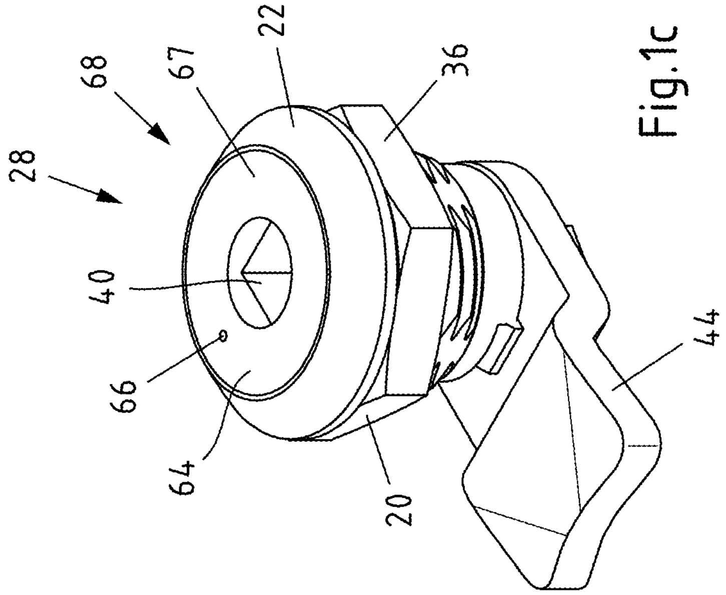
Figure 1F:
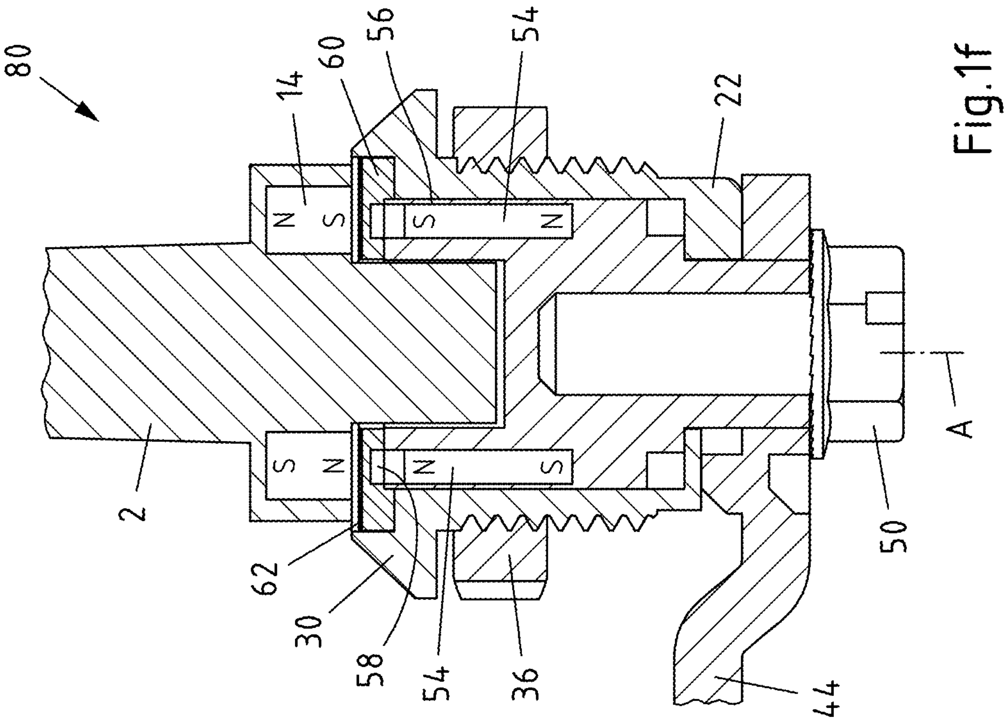
Figure 1E:
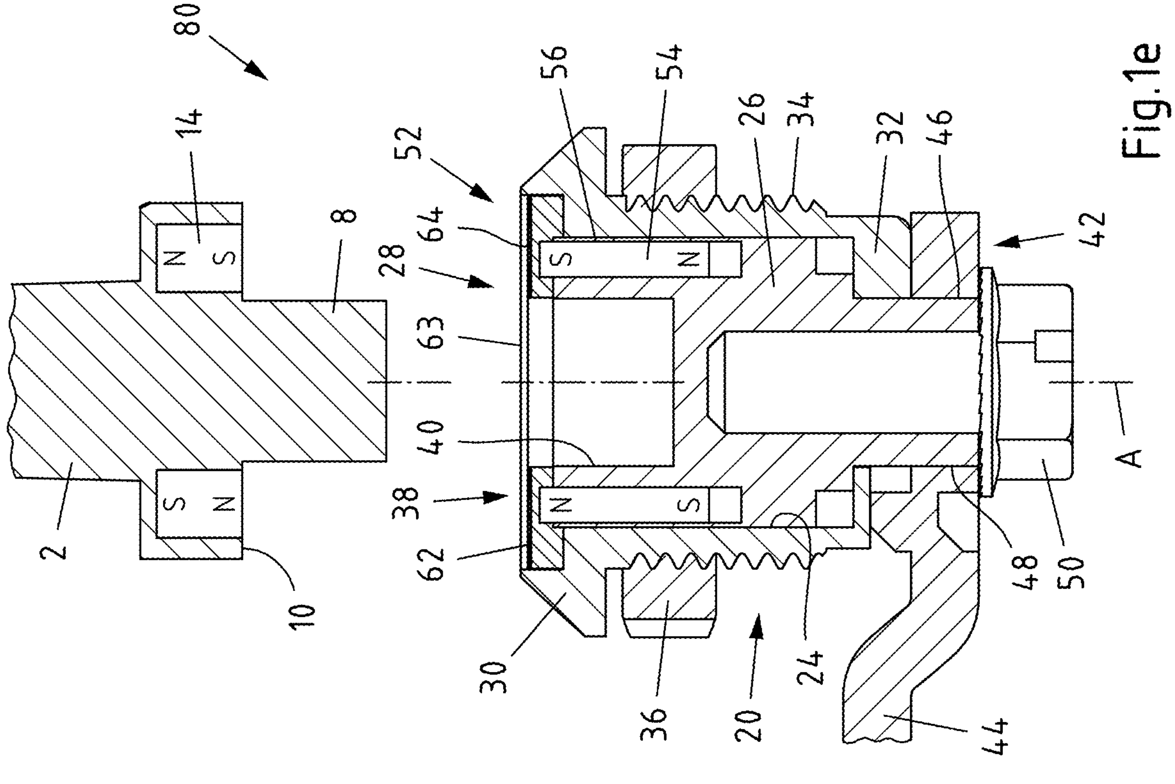
Figure 1G:
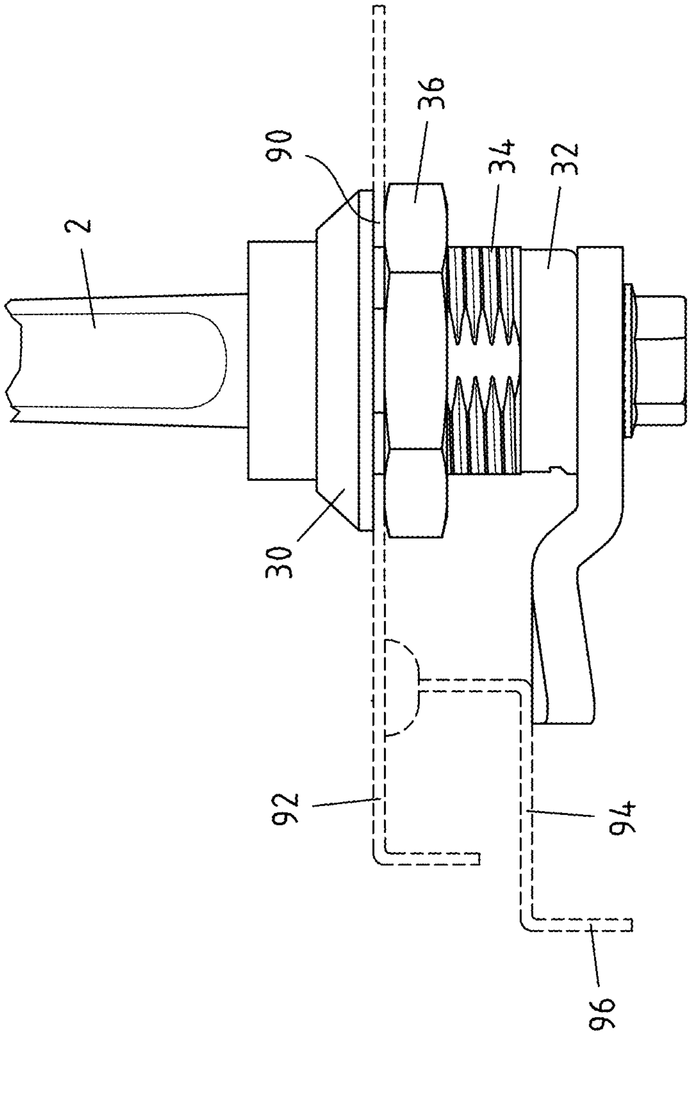

FIGS. 1*a-g* show a first exemplary embodiment of the lock, the key and the lock system. FIG. 1*a* shows a perspective view of the key 2 from diagonally above. FIG. 1*b* shows a partial perspective view of the key 2 from diagonally below. FIG. 1*c* shows the lock 20 in perspective view from diagonally above and diagonally from the front, respectively. FIG. 1*d* shows the lock 20 with the key 2 mounted in a perspective view from diagonally above and diagonally from the front, respectively. FIGS. 1*e* and 1*f* show the lock 20 and the key 2 in a sectional view, namely before the key 2 is mounted onto the lock 20 (FIG. 1*e*) and afterwards (FIG. 1*f*). FIG. 1*g* shows a side view of the lock 20 with the key 2 mounted in an installation situation.

The key 2 and the lock 20 together form a lock system 80. In the present example, the lock 20 is designed as a sash lock and the lock system 80 is designed accordingly as a sash lock system. Alternatively, the lock 20 could also be designed as a rod lock or axial lock and the lock system 80 correspondingly as a rod lock system or axial lock system.

The key 2 is a socket key with a handle part 4 and an attachment part 6, which in this example are formed in one piece. The attachment part has a key contour 8, which in the present example is designed as a polygonal contour, namely as a square projection. However, other key contours 8 are also conceivable. The attachment part 6 of the key has a collar 10 surrounding the key contour 8 with a magnet arrangement 12, which comprises several magnets 14 with a predetermined position and a predetermined pole orientation. The pole orientation of the individual magnets is labelled "N" or "S" in FIG. 1*b*, whereby a surface labelled "N" in FIG. 1*b* corresponds to the magnetic north pole and a surface labelled "S" in FIG. 1*b* corresponds to the magnetic south pole. In FIGS. 1*e-f*, the pole orientation of the magnets shown therein is also marked by "N" and "S", whereby "N" shows the arrangement of the magnetic north pole and "S" the arrangement of the magnetic south pole of the respective magnet. The magnets 14 visible in FIGS. 1*e-f* and labelled "N" and "S" have antiparallel pole orientations.

The sash lock 20 has a lock housing 22 with an inner channel 24, in which a lock core 26 is rotatably mounted about the axis A. The lock housing 22 has a collar 30 on the front side 28 of the sash lock 20, from which collar a housing body 32 with an external thread 34 extends.

For assembly, the sash lock 20 can be inserted with the housing body 32 first into an opening 90 of a thin sheet metal door 92 until the collar 30 comes into contact with the sheet metal door 92. A nut 36 can then be screwed onto the external thread 34 from behind to secure the sash lock 20 to the sheet metal door 92.

The lock core 26 is formed at the first end 38, which is accessible from the front 28, for torque-transmitting mounting of the key 2. For this purpose, the lock core 26 has at its first end 38 a lock contour 40 corresponding to the key contour 8, which in the present case is designed as a polygonal contour, namely as a square recess for receiving the key contour 8 designed as a square projection.

At the second end 42 of the lock core 26 opposite the first end 38, the lock core 26 carries a rotating tongue 44, which is connected to the lock core 26 in a rotationally fixed manner via corresponding contours 46, 48 on the lock core 26 and rotating tongue 44 and is fixed by means of a screw 50. By mounting and turning the key 2, the lock core 26 and thus the rotating tongue 44 can be rotated between an open position and a closed position. FIG. 1*g* illustrates the closed position in the installed state, in which the rotating tongue 44 engages behind a blocking surface 94 of a frame 96 surrounding the sheet metal door 92 and in this way locks the sheet metal door 92. When the lock core 26 is rotated by 90°, for example, the lock core 26 or the rotating tongue 44 moves to an open position in which the rotating tongue 44 no longer engages behind the blocking surface 94, so that the sheet metal door 92 can be opened.

The sash lock 20 further has blocking means 52, which block rotation of the lock core 26 in the lock housing 22 between the open position and the closed position when the key 2 is removed. In the example in FIGS. 1*a-g*, the blocking means 52 comprise a plurality of blocking elements 54, which are displaceably mounted in respective edge-side receptacles 56 of the lock core 26. The blocking elements 54 can be displaced in the respective receptacles 56 between a blocking position (see FIG. 1*e*) and a release position (see FIG. 1*f*). In the blocking position (FIG. 1*e*), the blocking elements 54 engage in respective recesses 58 of a shaped element 60 attached to the lock housing 22 and thereby, in a form-fit manner, block rotation of the lock core 26 in the lock housing 22 between the open position and the closed position. In the release position (FIG. 1*f*), the blocking elements 54 are retracted into the receptacles 56 and do not engage in the recesses 58, so that in this release position the blocking elements 54 release the rotation of the lock core 26 in the lock housing 22 between the open position and the closed position.

The blocking means 52 are configured to release the rotation of the lock core 26 in the lock housing 22 between the open position and the closed position when the key 2 with the magnet arrangement 12 is mounted on the first end 38 of the lock core 26. This is achieved in the sash lock 20 in that the blocking elements 54 are designed as magnets and in that the number, positions and pole orientations of the magnets 14 of the magnet arrangement 12 of the key 2 correspond to the number, positions and pole orientations of the blocking elements 54 in such a way, that when the key 2 is mounted, a magnet 14 of the magnet arrangement 12 and a respective blocking element 54 with the same magnetic poles are opposite each other, so that a magnetic repulsive force acts on the blocking elements 54, which moves the blocking elements 54 out of the respective recess 58 into the release position.

In this way, the sash lock 20 can be unlocked with a matching key 2 with a predetermined magnetic arrangement, while a key of the same type with a different magnetic arrangement in relation to the key contour 8 does not unlock the sash lock 20. The sash lock 20 and key 2 are thus magnetically coded via the number, positions and pole orientations of the magnets 14 of the magnet arrangement 12 and the corresponding number, positions and pole orientations of the blocking elements 54.

In order to retain the blocking elements 54 in the blocking position when the key 2 is removed, a retaining element 62 in the form of a ferromagnetic sheet, for example sheet steel, with a central opening 63 for the lock contour 40 is provided on the lock housing 22. The blocking elements 54 are held in the recesses 58 by magnetic attraction between the blocking elements 54 and the retaining element 62. The strengths of the magnets 14 and the blocking elements 54 designed as magnets are adapted such that, when the key 2 is mounted, the magnetic attraction force between the blocking elements 54 and the retaining element 62 is overcome by the magnetic repulsion force between the magnets 14 and the blocking elements 54 and the blocking elements 54 move into the release position.

In order to increase the durability of the sash lock 20, magnets, which are each surrounded by a steel sleeve, may also be used as blocking elements 54 in one possible embodiment.

On the annular end face 64 of the lock housing 22, which lock housing in the present example is formed by one side of the retaining element 62, a marking 66 is provided, which marking corresponds to a marking 16 on the key 2 to indicate to the user the correct orientation of the key 2 with respect to the sash lock 20 for the correct orientation of the magnet arrangement 12 with respect to the blocking elements 54.

In the sash lock 20, the end face 64 simultaneously forms an abutment surface 67 of an abutment surface arrangement 68 of the sash lock 20, which is provided for contacting the magnet arrangement 12 in the orientation specified by the markings 16 and 66. The abutment surface 67 is arranged separately from the lock contour 40, namely radially outside the lock contour 40 in relation to the axis of rotation A. The blocking elements 54 are correspondingly also arranged separately from the lock contour 40, namely in the region of the abutment surface 67.

In this way, the unlocking function, caused by the magnetic interaction between the magnet arrangement 12 and the blocking elements 54 when the magnet arrangement 12 contacts the abutment surface 67, is spatially separated by design from the torque transmission function, caused by the form-fit interaction between the key contour 8 and the lock contour 40. As a result, the lock contour 40 and the key contour 8 can be optimized for torque transmission, in particular designed to be more robust, without having to integrate movable or filigree components such as magnets and blocking elements directly into the lock contour 40 and the key contour 8.

Figure 2A:
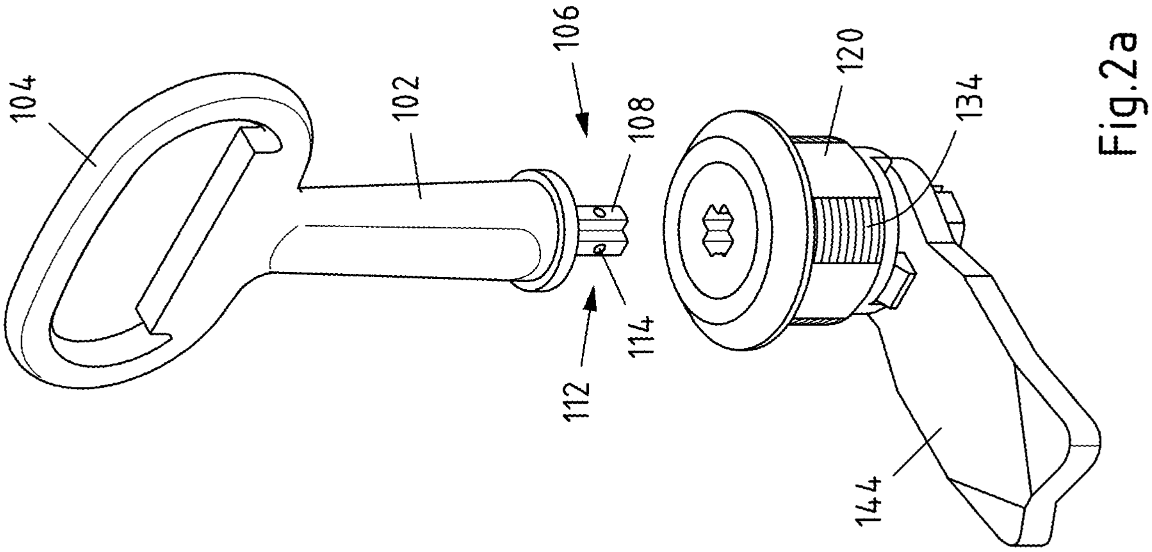
FIGS. 2*a-g* show a second exemplary embodiment of the lock, the key and the lock system.
Figure 2B:
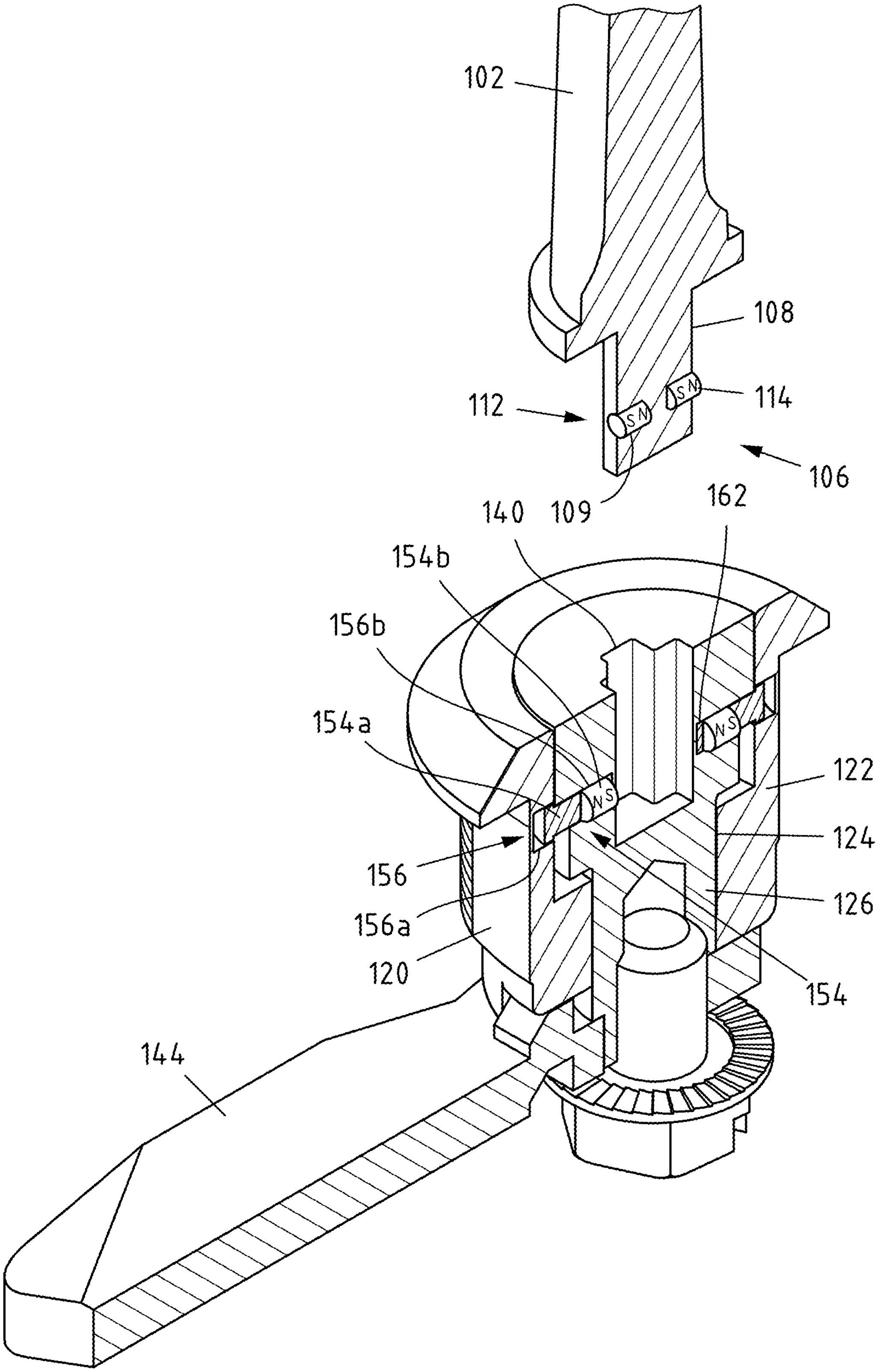
Figure 2C:
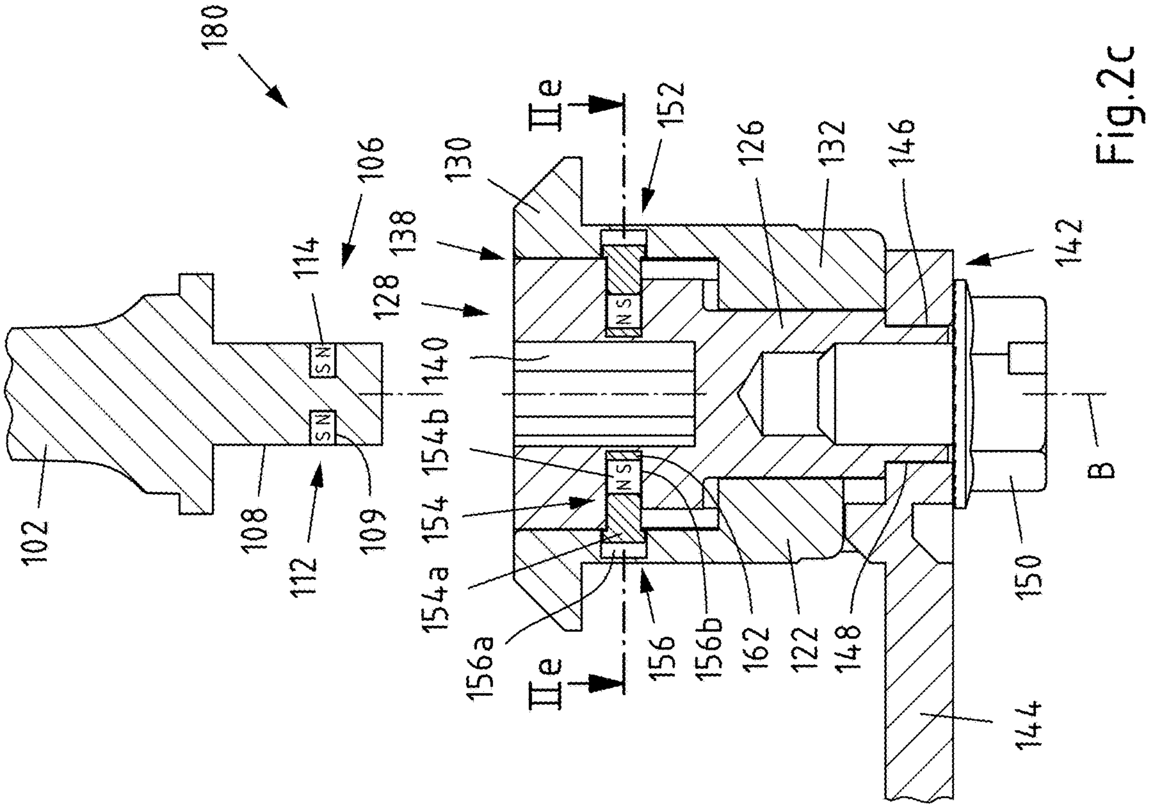
Figure 2D:
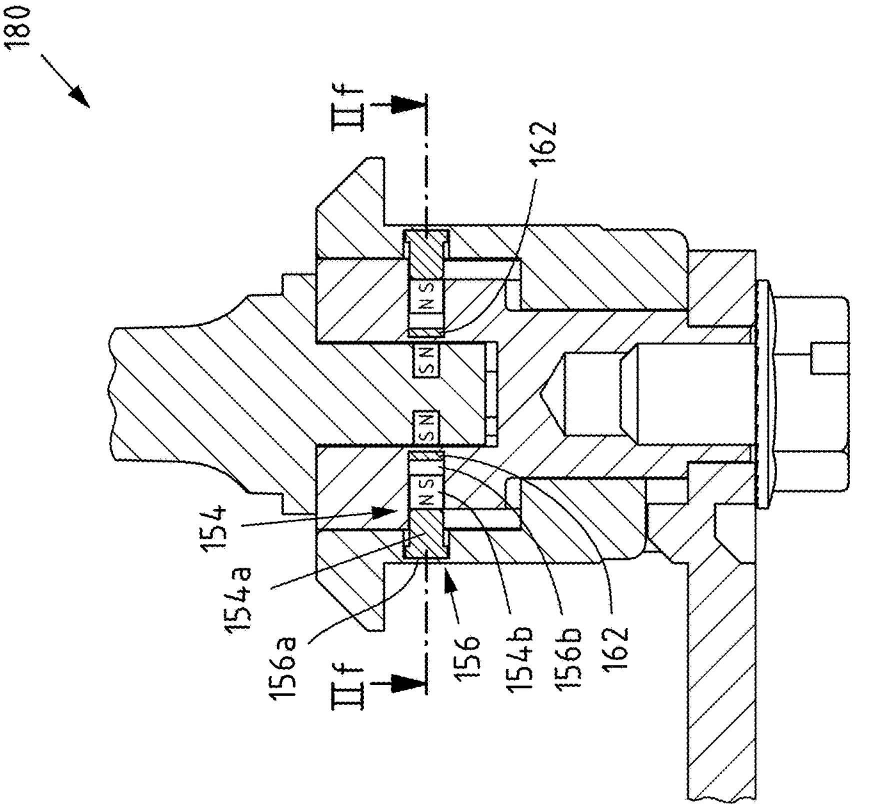
Figure 2E:
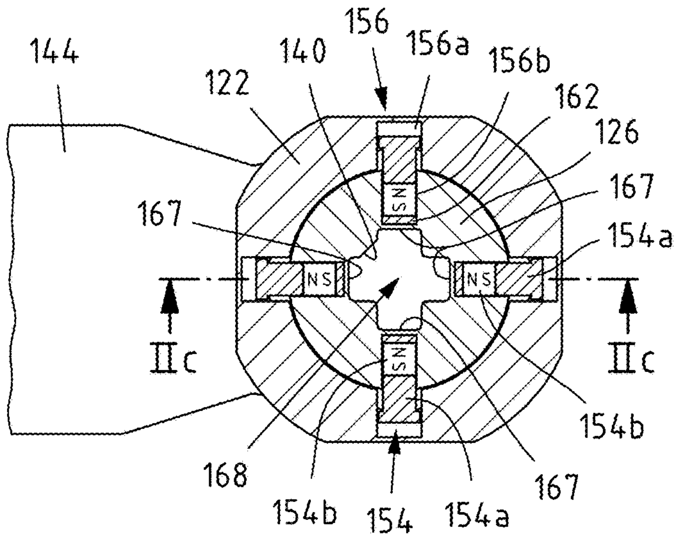
Figure 2F:
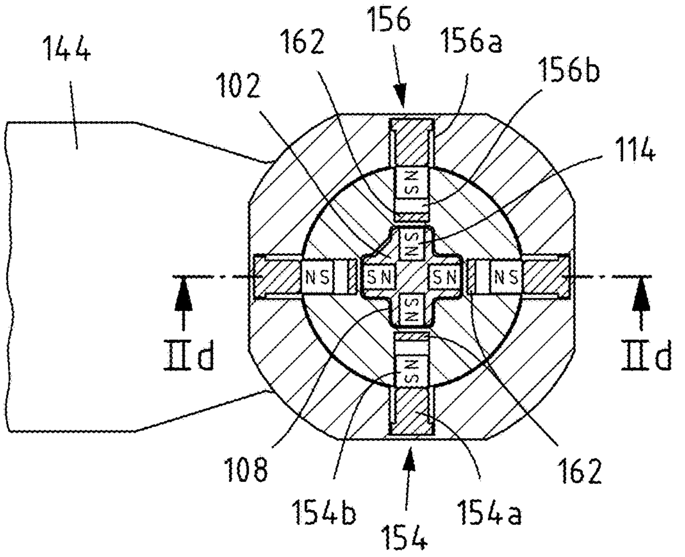
Figure 2G:
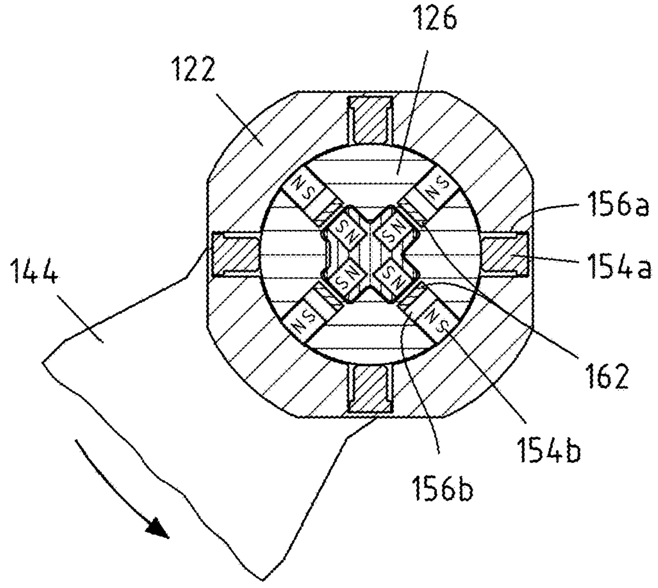

FIGS. 2*a*-*g* show a second exemplary embodiment of the lock, the key and the lock system. FIG. 2*a* shows the key 102 and the lock 120 in perspective view. FIG. 2*b* shows the key 102 and the lock 120 in perspective view with partial cut-out corresponding to the sectional plane labelled "IIc" in FIG. 2*e*. FIGS. 2*c* and 2*d* show the key 102 and the lock 120 in a sectional view according to the sectional plane labelled "IIc" in FIG. 2*e*, namely before the key 102 is mounted (FIG. 2*c*) and after the key 102 is mounted (FIG. 2*d*). FIG. 2*e* shows a sectional view corresponding to the sectional plane labelled "IIe" in FIG. 2*c*. FIG. 2*f* shows a sectional view corresponding to the sectional plane labelled "IIf" in FIG. 2*d*. FIG. 2*g* shows a sectional view corresponding to FIG. 2*f* after rotating the lock core by 45°.

The key 102 and the lock 120 together form a lock system 180.

In the present example, the lock 120 is designed as a sash lock and the lock system 180 is designed accordingly as a sash lock system. Alternatively, the lock 120 could, for example, also be designed as a rod lock or axial lock and the lock system 180 correspondingly as a rod lock system or axial lock system.

The key 102 is also a socket key with a handle part 104 and an attachment part 106, which in the present example are formed in one piece. The attachment part 106 has a key contour 108, which in the present example is formed as a polygonal contour, namely as a cross-shaped projection. However, other key contours 108 are also conceivable. In the key 102, a magnet arrangement 112 with a plurality of magnets 114 is arranged on the key contour 108. The magnets 114 are inserted into four radial blind bores 109 of the key contour 108. The magnets 114 have predetermined pole orientations, some of which are shown in the figures as "N" (magnetic north pole) and "S" (magnetic south pole).

The sash lock 120 has a lock housing 122 with an inner channel 124, in which a lock core 126 is rotatably mounted about the axis B. The lock housing 122 has a collar 130 on the front side 128 of the sash lock 120, from which collar a housing body 132 with an external thread 134 extends. The assembly of the sash lock 120 can be carried out as described for the sash lock 20.

The lock core 126 is formed at the first end 138, which is accessible from the front side 128, for torque-transmitting mounting of the key 102. For this purpose, the lock core 126 has at its first end 138 a lock contour 140 corresponding to the key contour 108, which in the present case is formed as a cross-shaped recess for receiving the key contour 108 formed as a cross-shaped projection.

At the second end 142 of the lock core 126 opposite the first end 138, the lock core 126 carries a rotating tongue 144, which is connected to the lock core 126 in a rotationally fixed manner via corresponding contours 146, 148 on the lock core 126 and rotating tongue 144 and is fixed by means of a screw 150. The rotating of the lock core 126 and thus of the rotating tongue 144 between an open position and a closed position, when the key 102 is mounted, takes place in the same way as described above for the sash lock 20.

The sash lock 120 further comprises blocking means 152 which, when the key 102 is removed, block rotation of the lock core 126 in the lock housing 122 between the open position and the closed position. In the example in FIGS. 2*a*-*g*, the blocking means 152 comprise a plurality of blocking elements 154, which are mounted so as to be radially displaceable in relation to the axis of rotation B in receptacles 156 formed by the lock housing 122 and the lock core 126. Accordingly, a receptacle 156 comprises a first part 156*a* formed by the lock housing 122 and a second part 156*b* formed by the lock core 126. In the lock 120, The blocking elements 154 are each formed in two parts and each comprise a steel pin 154*a* and a magnet 154*b*, which are held together by the magnetic force between the steel pin 154*a* and the magnet 154*b*.

The blocking elements 154 can be displaced in the respective receptacles 156 between a blocking position (see FIG. 2*c* and FIG. 2*e*) and a release position (see FIG. 2*d* and FIG. 2*f*). In the blocking position (FIGS. 2*c* and 2*e*), the blocking elements 154 are arranged such that the respective steel pins 154*a* are arranged both in the first part 156*a* and in the second part 156*b* of the respective receptacle 156 and thereby, in a form-fit manner, block a rotation of the lock core 126 in the lock housing 122 between the open position and the closed position. In the release position (FIGS. 2*d* and 20, the blocking elements 154 are arranged such that the steel pins 154*a* are arranged only in the first part 156*a* and the magnets 154*b* are arranged only in the second part 156*b* of the receptacle 156, so that the blocking elements 154 in this release position release the rotation of the lock core 126 in the lock housing 122 between the open position and the closed position and the lock core 126 can be rotated as shown in FIG. 2*g* with the respective separation of the steel pins 154*a* from the magnets 154*b*.

The blocking means 152 are configured to release the rotation of the lock core 126 in the lock housing 122 between the open position and the closed position when the key 102 with the magnet arrangement 112 is mounted on the first end 138 of the lock core 126. This is achieved in the sash lock 120 in that the number, positions and pole orientations of the magnets 114 of the magnet arrangement 112 of the key 102 correspond to the number, positions and pole orientations of the magnets 154*b* of the blocking elements 154, so that, when the key 102 is mounted, a respective magnet 114 of the magnet arrangement 112 and a respective magnet 154*b* of the blocking element 154 are opposite one another with the same magnetic poles, so that a magnetic repulsive force acts on the magnets 154*b*, which repulsive force moves the magnets 154*b* and thus also the respective steel pins 154*a* in the receptacle 156 into the release position.

In this way, the sash lock 120 can be unlocked with a matching key 102 with a predetermined magnet arrangement, while a key of the same type with respect to the key contour 108 with a different magnet arrangement does not cause the sash lock 120 to be unlocked. The sash lock 120 and key 102 are thus magnetically coded via the number, positions and pole orientations of the magnets 114 of the magnet arrangement 112 and the corresponding number, positions and pole orientations of the magnets 154*b* of the blocking elements 154.

In order to retain the blocking elements 154 in the blocking position when the key 102 is removed, retaining elements 162 in the form of ferromagnetic elements, for example steel elements, are provided in the lock core 126. Magnetic attraction between the magnets 154*b* of the blocking elements 154 and the retaining elements 162 holds the magnets 154*b* and thus the blocking elements 154 as a whole in the blocking position. The strength of the magnets 114 and the magnets 154*b* of the blocking elements 154 is adapted such that, when the key 102 is mounted, the magnetic attraction force between the magnets 154*b* and the retaining elements 162 is overcome by the magnetic repulsion force between the magnets 114 and the magnets 154*b* and the blocking elements 154 move into the release position.

The lock contour 140 and the key contour 108 are asymmetrical in the present example, so that the key contour 108 can only be inserted into the lock contour 140 in a predetermined orientation in which the correct alignment of the magnet arrangement 112 to the magnets 154*b* of the blocking elements 154 is ensured when the key 102 is inserted.

Four side surfaces of the lock contour 140 form abutment surfaces 167 of an abutment surface arrangement 168 of the sash lock 20 in the sash lock 120, which are provided for contacting the magnet arrangement 112 in the orientation specified by the asymmetrical shape of lock contour 140 and key contour 108. The abutment surfaces 167 are arranged on the lock contour 140 of the sash lock 120. The blocking elements 154 are correspondingly also arranged on the lock contour 140, namely in the region of the abutment surfaces 167.

In this way, the security of the sash lock 120 against unauthorized actuation is increased since the abutment surfaces 167 are not readily accessible from the outside and therefore manipulation of the sash lock 120 without a suitable key by attaching magnets is made more difficult.

Figure 3B:
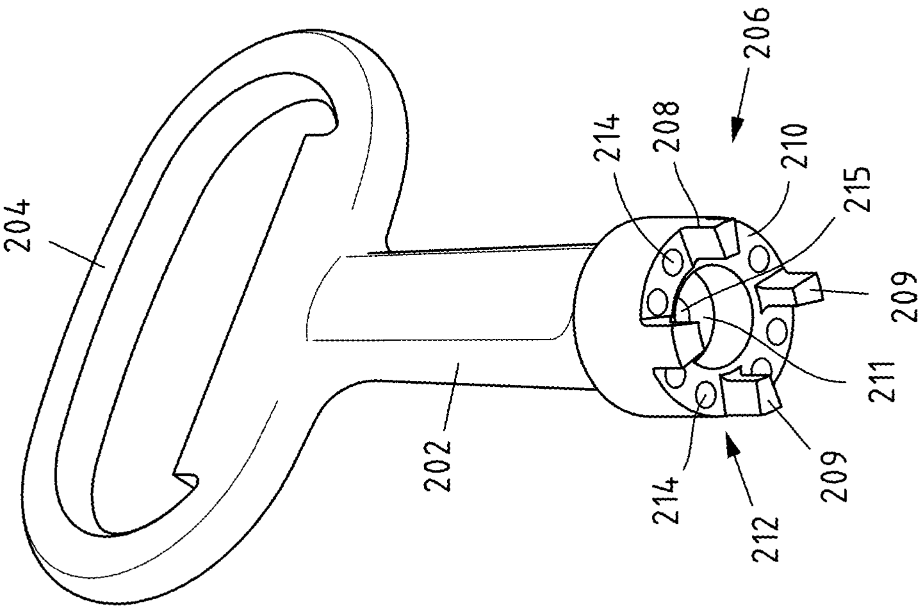
FIGS. 3*a-l* show a third exemplary embodiment of the lock, the key and the lock system.
Figure 3A:
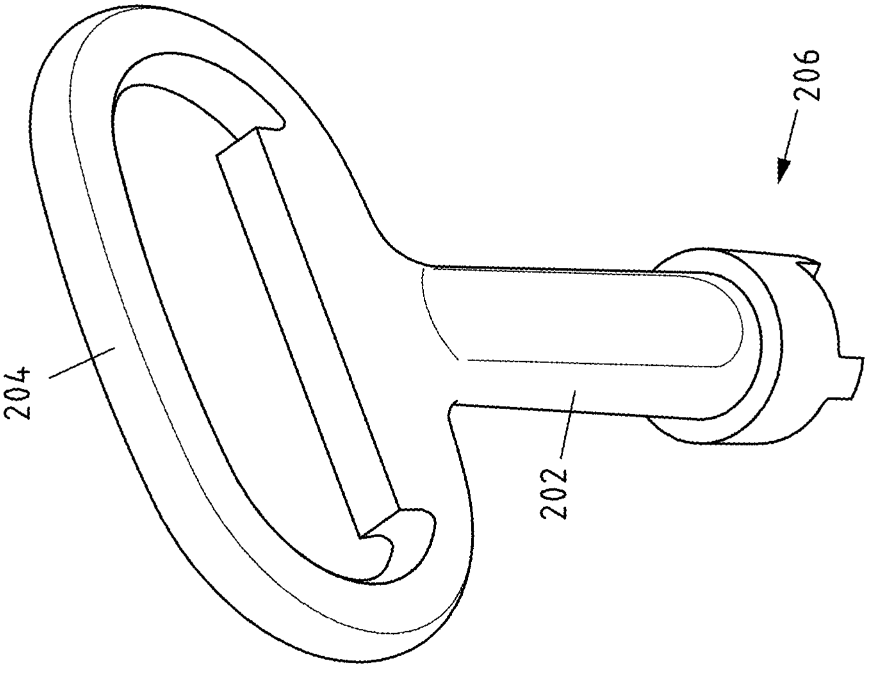
Figure 3C:
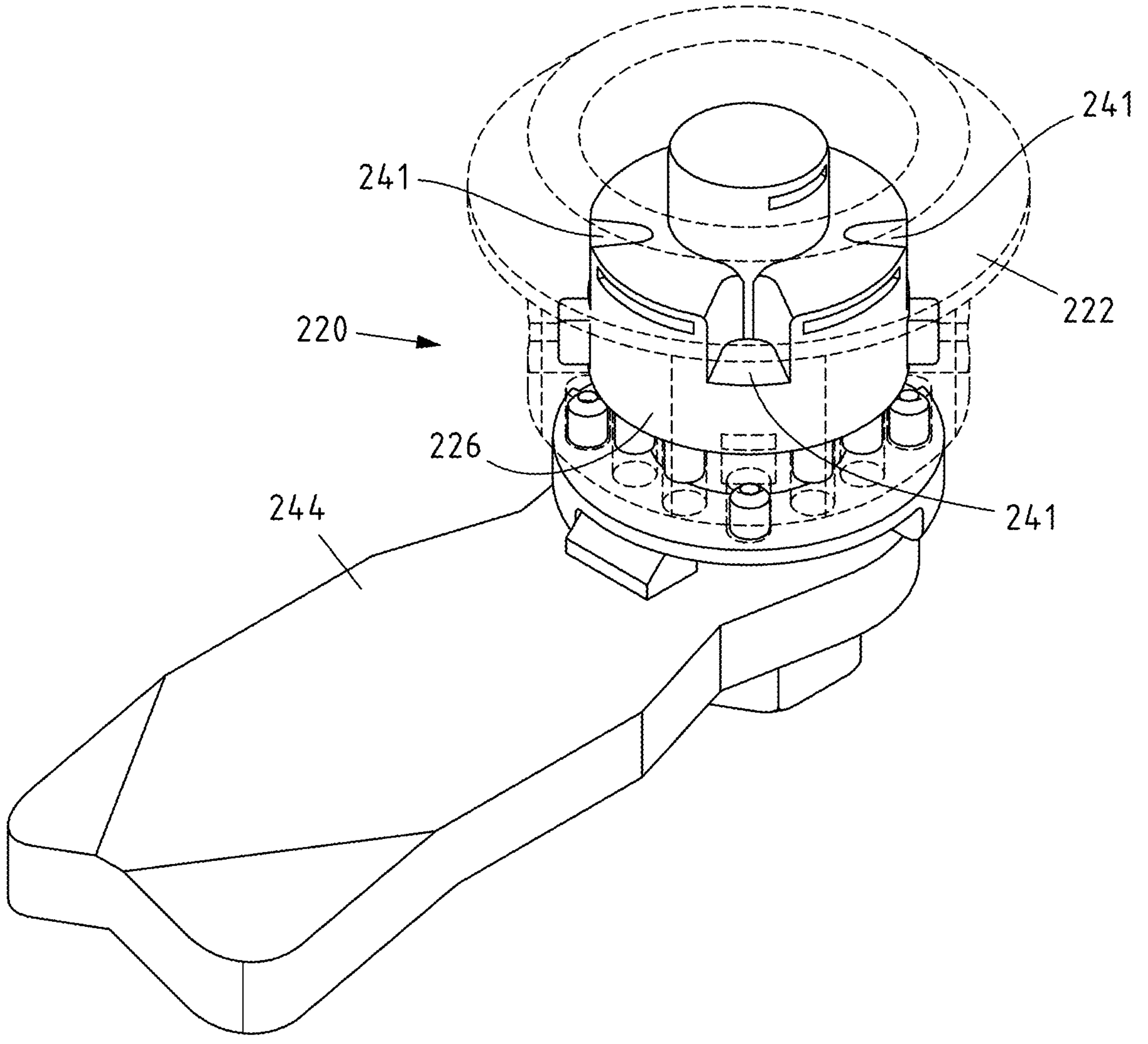
Figure 3E:
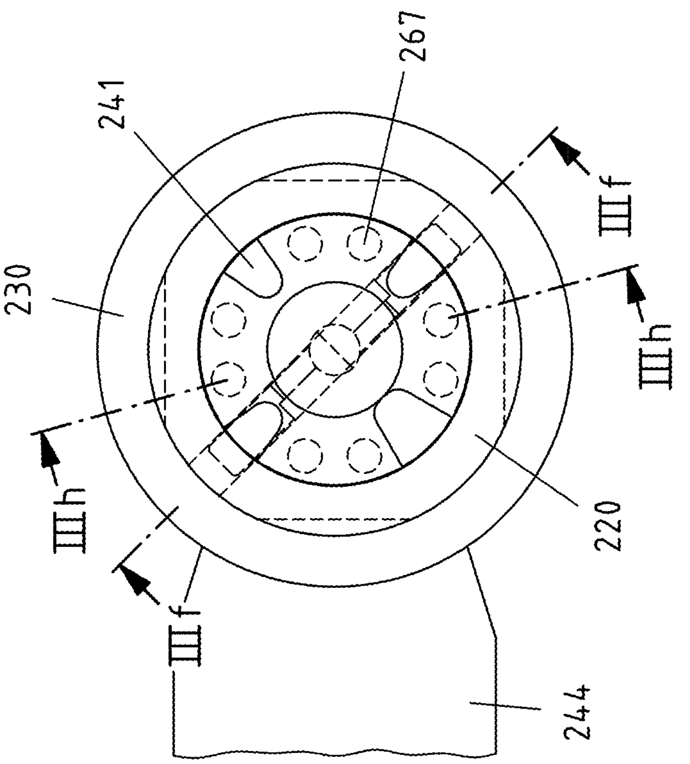
Figure 3D:
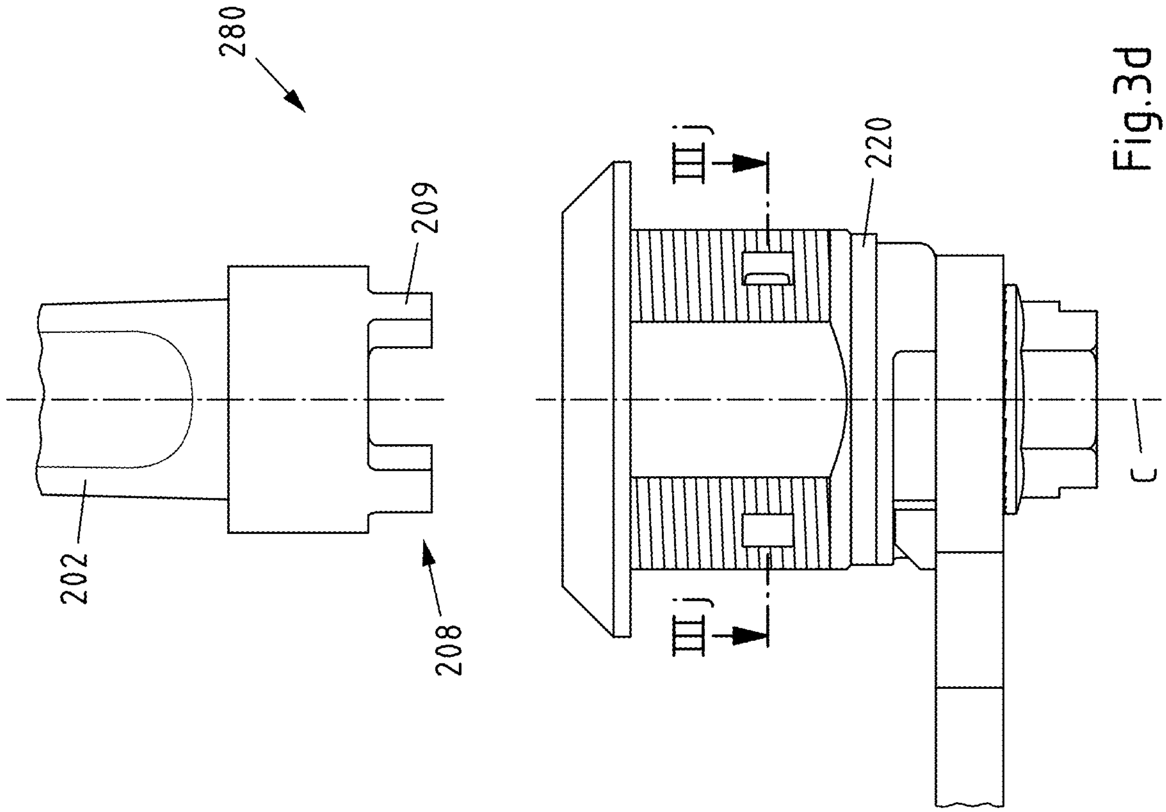
Figure 3G:
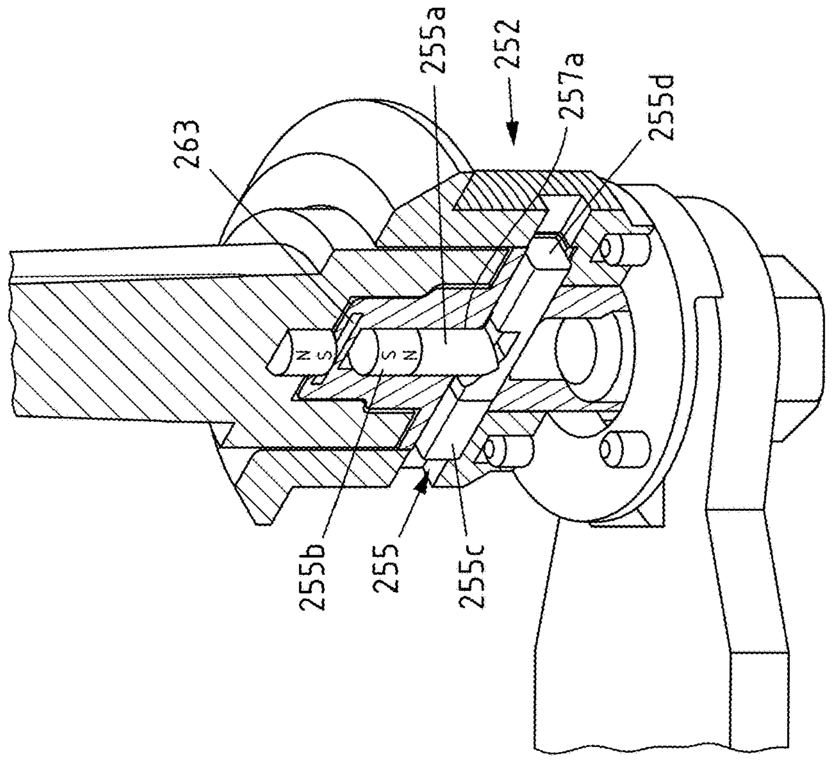
Figure 3F:
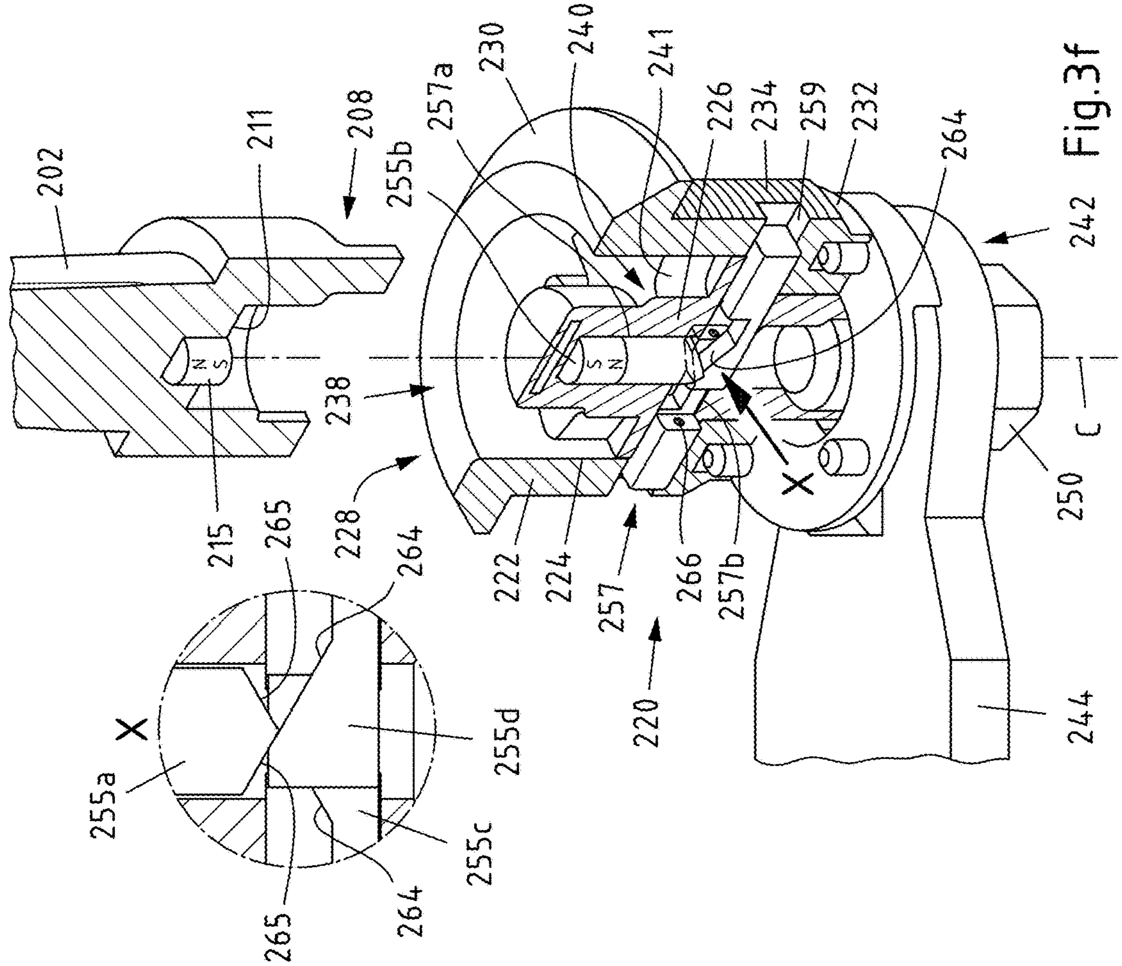
Figure 3I:
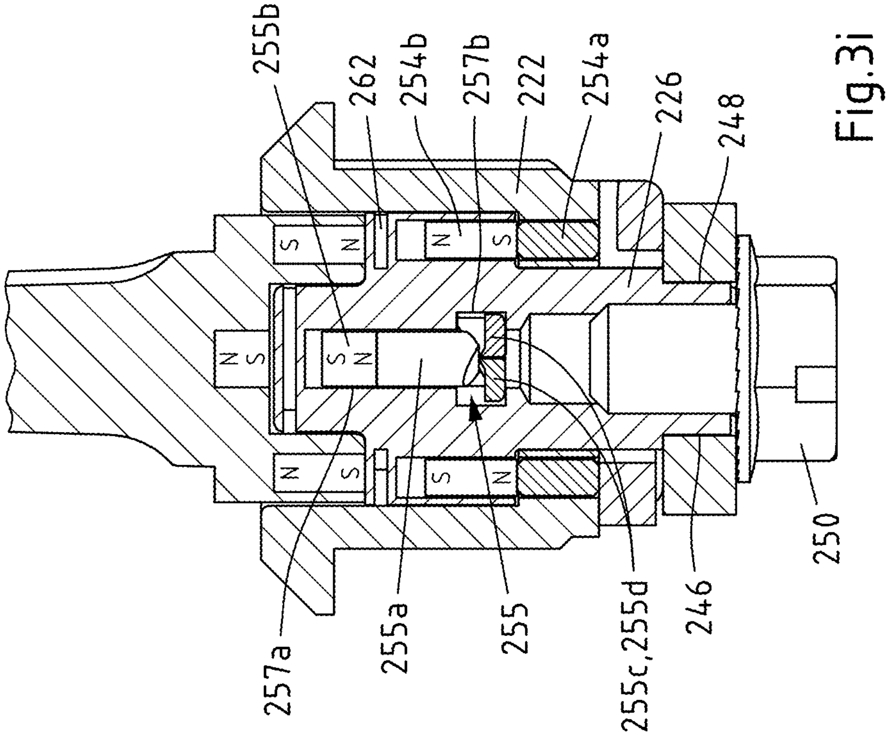
Figure 3H:
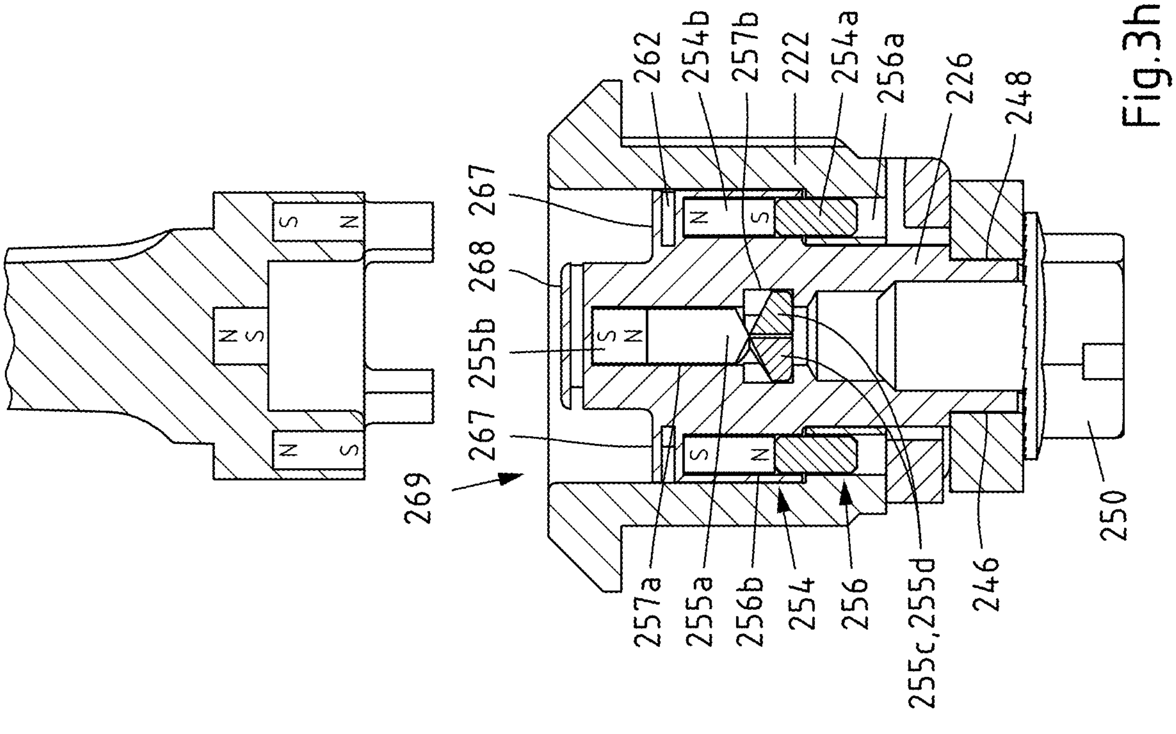
Figure 3J:
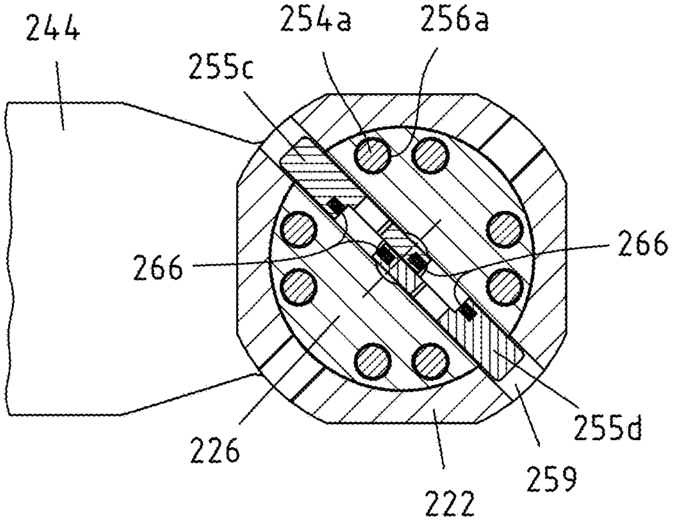
Figure 3K:
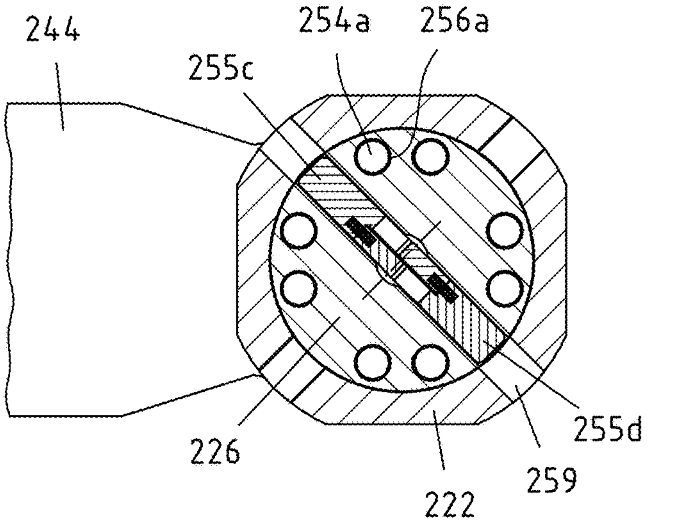
Figure 3L:
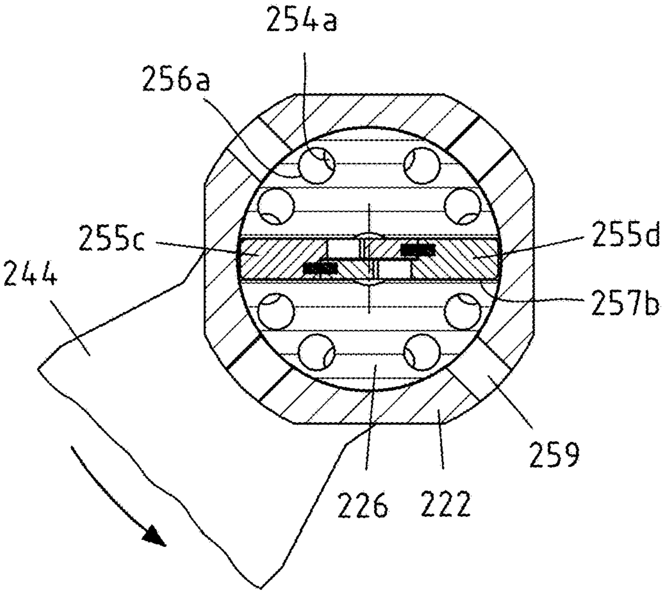

FIGS. 3*a*-*l* show a third exemplary embodiment of the lock, the key and the lock system. FIGS. 3*a*-*b* show the key 202 in perspective view from diagonally above (FIG. 3*a*) and diagonally below (FIG. 3*b*). FIG. 3*c* shows the lock 220 in perspective view from diagonally above and diagonally from the front, respectively, whereby some parts are shown as transparent with dashed lines for the sake of clarity. FIG. 3*d* shows a side view of the key 202 and the lock 220. FIG. 3*e* shows a top view of the lock 220. FIGS. 3*f* and 3*g* show perspective views with partial break-out corresponding to the sectional plane labelled "IIIf" in FIG. 3*e*, namely before the key 202 is mounted (FIG. 3*f*) and after the key 202 is mounted (FIG. 3*g*). FIG. 3*f* also shows—In the dotted circle—an enlarged detail in sectional view according to the viewing direction labelled "X" in the perspective view. FIGS. 3*h* and 3*i* show sectional views corresponding to the sectional plane labelled "IIIh" in FIG. 3*e*, namely before the mounting of the key 202 (FIG. 3*h*) and after the mounting of the key 202 (FIG. 3*i*). FIGS. 3*j*, 3*k* and 3*l* show sectional views corresponding to the sectional plane labelled "IIIj" in FIG. 3*d*, namely before mounting the key 202 (FIG. 3*j*), after mounting the key 202 (FIG. 3*k*) and after rotating the lock core 226 with the mounted key 202 by 450 (FIG. 3*l*).

The key 202 and the lock 220 together form a lock system 280.

In the present example, the lock 220 is designed as a sash lock and the lock system 280 is correspondingly designed as a sash lock system. Alternatively, the lock 220 could, for example, also be designed as a rod lock or axial lock and the lock system 280 correspondingly as a rod lock system or axial lock system.

The key 202 is a socket key with a handle part 204 and an attachment part 206, which in the present example are formed in one piece. The attachment part 206 has a key contour 208, which in the present example comprises four ring segment-like projections 209. However, other key contours 208 are also conceivable. The attachment part 206 of the key has a magnet arrangement 212 with several magnets 214, 215, each with predetermined position and predetermined pole orientation. Some of the magnets 214 of the magnet arrangement 212 are arranged in surfaces 210 of the socket part 206, which surfaces are set back relative to the ring segment-like projections 209 and lie between the ring segment-like projections 209. A further magnet 215 of the magnet arrangement 212 is arranged in a central surface 211 which is set back relative to the surfaces 210.

The pole orientations of the individual magnets 214, 215 are partially marked in the figures with "N" (magnetic north pole) and "S" (magnetic south pole).

The sash lock 220 has a lock housing 222 (shown in FIG. 3*c* as partially transparent with dashed lines for the sake of clarity) with an inner channel 224, in which a lock core 226 is rotatably mounted about the axis C. The lock housing 222 has a collar 230 on the front side 228 of the sash lock 220, from which a housing body 232 with an external thread 234 extends. The assembly of the sash lock 220 can be carried out as described for the sash lock 20.

The lock core 226 is formed at the first end 238, which is accessible from the front side 228, for torque-transmitting mounting of the key 202. For this purpose, the lock core 226 has at its first end 238 a lock contour 240 corresponding to the key contour 208, which is formed in the present case in the form of four recesses 241 corresponding to the ring segment-like projections 209.

At the second end 242 of the lock core 226 opposite the first end 238, the lock core 226 carries a rotating tongue 244, which is connected to the lock core 226 in a rotationally fixed manner via corresponding contours 246, 248 on the lock core 226 and rotating tongue 244 and is fixed by means of a screw 250. The rotation of the lock core 226 and thus of the rotating tongue 244 between an open position and a closed position when the key 202 is mounted is performed in the same way as described above for the sash lock 20.

The sash lock 220 also has blocking means 252, which, when the key 202 is removed, block rotation of the lock core 226 in the lock housing 222 between the open position and the closed position. In the example in FIGS. 3*a*-1, the blocking means 252 comprise axial blocking elements 254 for axial locking and further a radial blocking element 255 for radial locking.

The axial blocking elements 254 are formed in two parts and each comprise a steel pin 254*a* and a magnet 254*b*. The axial blocking elements 254 are each axially displaceably mounted in receptacles 256 formed by the lock core 226 and the lock housing 222. Accordingly, a receptacle 256 comprises a first part 256*a* formed by the lock housing 222 and a second part 256*b* formed by the lock core 226.

The blocking elements 254 can be displaced in the respective receptacles 256 between a blocking position (see FIG. 3*h*) and a release position (see FIG. 3*i*). In the blocking position (FIG. 3*h*), the blocking elements 254 are arranged such that the respective steel pins 254*a* are arranged both in the first part 256*a* and in the second part 256*b* of the respective receptacle 256 and thereby, in a form-fit manner, block a rotation of the lock core 226 in the lock housing 222 between the open position and the closed position. In the release position (FIG. 3*i*), the blocking elements 254 are arranged in such a way that the steel pins 254*a* are arranged only in the first part 256*a* and the magnets 254*b* only in the second part 256*b* of the receptacle 256, so that the blocking elements 254 in this release position release the rotation of the lock core 226 in the lock housing 222 between the open position and the closed position and—when the radial blocking element 255 is also in the release position—the lock core 226 can be rotated with respective separation of the steel pins 254*a* from the magnets 254*b*.

The radial blocking element 255 also has a multi-part design and comprises a steel pin 255*a* and a magnet 255*b* as well as two slides 255*c-d*, which are arranged in a receptacle 257 of the lock core 226. The receptacle has a central, axial part 257*a*, in which the steel pin 255*a* and the magnet 255*b* are axially displaceably mounted, as well as a radial part 257*b*, in which the slides 255*c-d* are radially displaceably mounted. The slides 255*c-d* can be displaced in the radial part 257*b* of the receptacle 257 between a respective blocking position (see FIG. 30 and a release position (see FIG. 3*g*) of the radial blocking element 255. In the blocking position (FIG. 30, the slides 255*c-d* of the blocking element 255 engage in respective radial recesses 259 in the lock housing 222 and thereby, in a form-fit manner, block a rotation of the lock core 226 in the lock housing 222 between the open position and the closed position. In the release position (FIG. 3*g*), the slides 255*c-d* of the blocking element 255 are retracted into the receptacle 257 and do not engage in the recesses 259, so that in this release position the blocking element 255 releases the rotation of the lock core 226 in the lock housing 222 between the open position and the closed position.

The blocking means 252 are configured to release the rotation of the lock core 226 in the lock housing 222 between the open position and the closed position when the key 202 with the magnet arrangement 212 is mounted on the first end 238 of the lock core 226.

With respect to the axial blocking elements 254, this is achieved in the sash lock 220 in that the number, positions and pole orientations of the magnets 214 of the magnet arrangement 212 of the key 202 correspond to the number, positions and pole orientations of the magnets 254*b* of the axial blocking elements 254, so that when the key 202 is mounted, a respective magnet 214 of the magnet arrangement 212 and a respective magnet 254*b* of an axial blocking element 254 with the same magnetic poles are opposite one another, so that a magnetic repulsive force acts on the magnets 254*b* and thus on the respective blocking elements 254, which force moves the blocking elements 254 out into the release position.

With respect to the radial blocking element 255, unlocking is achieved with the sash lock 220 in that the position and pole orientation of the magnet 215 corresponds to the position and pole orientation of the magnet 255*b* in such a way that, when the key 202 is mounted, the magnet 215 of the magnet arrangement 212 and the magnet 255*b* lie opposite each other with the same magnetic poles, so that a magnetic repulsive force acts on the magnet 255*b* and thus on the steel pin 255*a*, which repulsive force moves the steel pin 255*a* in the direction of the slides 255*c-d*. Corresponding inclined surfaces 264, 265 are provided on the slides 255*c-d* and the steel pin 255*a*, which inclined surfaces interact when the steel pin 255*a* is moved in the direction of the slides 255*c-d* in such a way that the slides 255*c-d* are pulled back into the receptacle 257 and the blocking element 255 is thus moved into the release position.

In this way, the sash lock 220 can be unlocked with a matching key 202 with a predetermined magnetic arrangement, while a key of the same type with respect to the key contour 208 with a different magnetic arrangement does not cause the sash lock 220 to be unlocked. The sash lock 220 and key 202 are thus magnetically coded via the number, positions and pole orientations of the magnets of the magnet arrangement and the corresponding number, positions and pole orientations of the blocking elements 254.

In order to retain the axial blocking elements 254 in the blocking position when the key 202 is removed, retaining elements 262 in the form of ferromagnetic elements are provided in the lock core 226. The blocking elements 254 are held in the blocking position by magnetic attraction between the magnets 254*b* of the blocking elements 254 and the retaining elements 262. The strengths of the magnets 214 and the magnets 254*b* of the blocking elements 254 are adapted such that, when the key 202 is mounted, the magnetic attraction force between the magnets 254*b* and the retaining elements 262 is overcome by the magnetic repulsion force between the magnets 214 and the magnets 254*b* and the blocking elements 254 move into the release position.

In order to retain the radial blocking element 255 in the blocking position when the key 202 is removed, a retaining element 263 in the form of a ferromagnetic element is further provided in the lock core 226 at the central receptacle 257*a*. Furthermore, corresponding magnets 266 are provided on the slides 255*c-d* and arranged in such a way that two magnets 266 with the same poles face each other. Magnetic attraction between the magnet 255*b* and the retaining element 263 holds the magnet 255*b* and thus also the steel pin 255*a* in a position remote from the slides 255*c-d*. Magnetic repulsion force between the corresponding magnets 266 of the slides 255*c-d* holds the slides 255*c-d* in the recesses 241 and thus the blocking element 255 in the blocking position. The strengths of the magnet 215, the magnet 255*b* and the magnets 266 are adapted such that, when the key 202 is mounted, the magnetic attraction force between the magnet 255*b* and the retaining element 263 is overcome by the magnetic repulsion force between the magnet 215 and the magnet 255*b* and, when the magnet 255*b* and the steel pin 255*a* are moved in the direction of the slides 255*c-d*, the slides 255*c-d* are retracted into the receptacle 257 against the magnetic repulsive force of the magnets 266 by the interaction of the inclined surfaces 264, 265 and thus the radial blocking element 255 is moved into the release position.

In the sash lock 220, the surfaces 267 between the recesses 241 and the centrally projecting surface 268 form respective abutment surfaces of an abutment surface arrangement 269 of the sash lock 220, which is provided for contacting the magnet arrangement 212.

The combination of radially and axially movable blocking elements gives the sash lock 220 a particularly high level of vibration resistance.

Figure 4A:
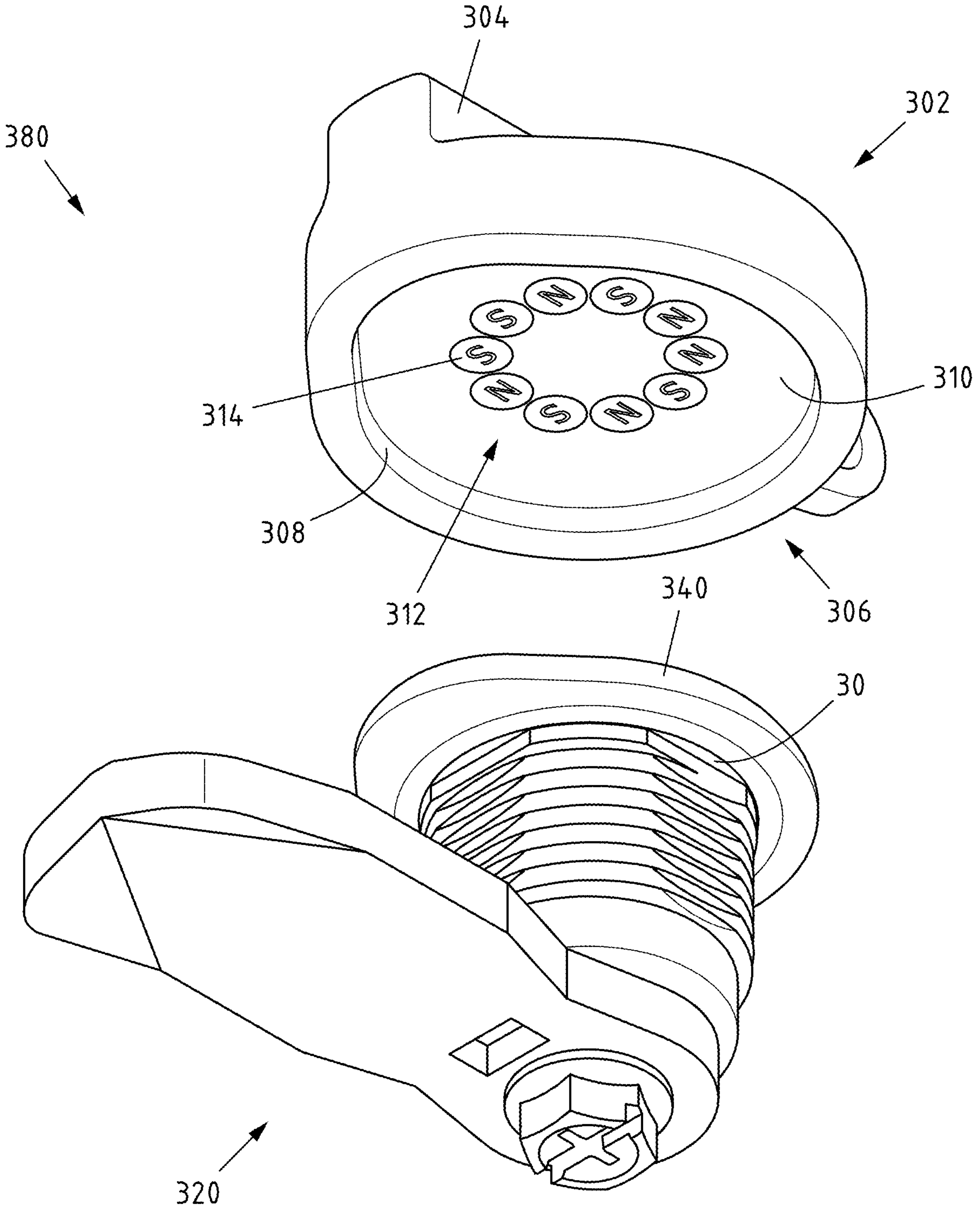
FIGS. 4*a-e* show a fourth exemplary embodiment of the lock, the key and the lock system.
Figure 4B:
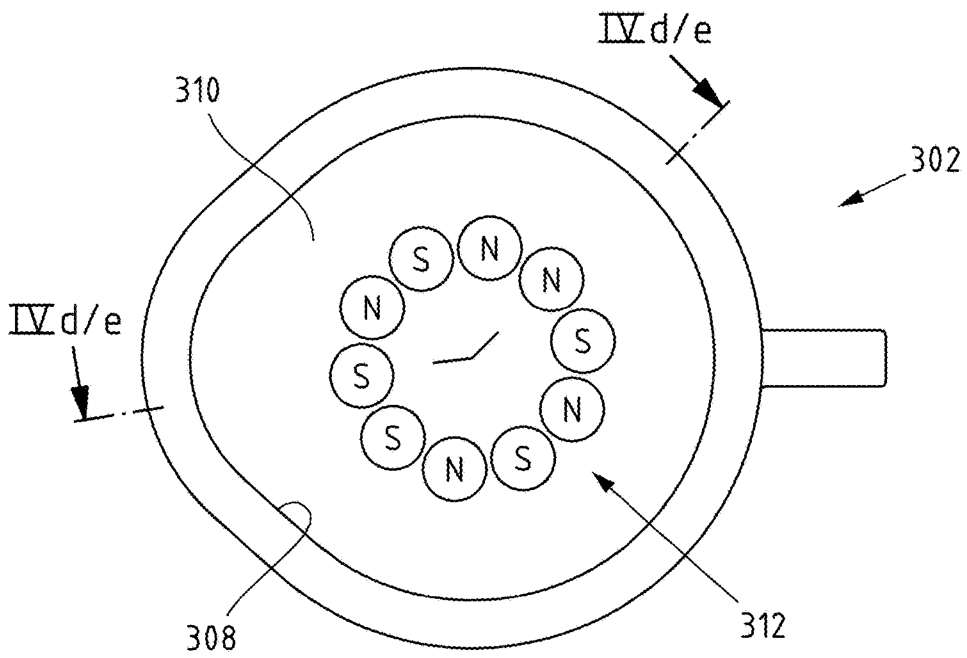
Figure 4C:
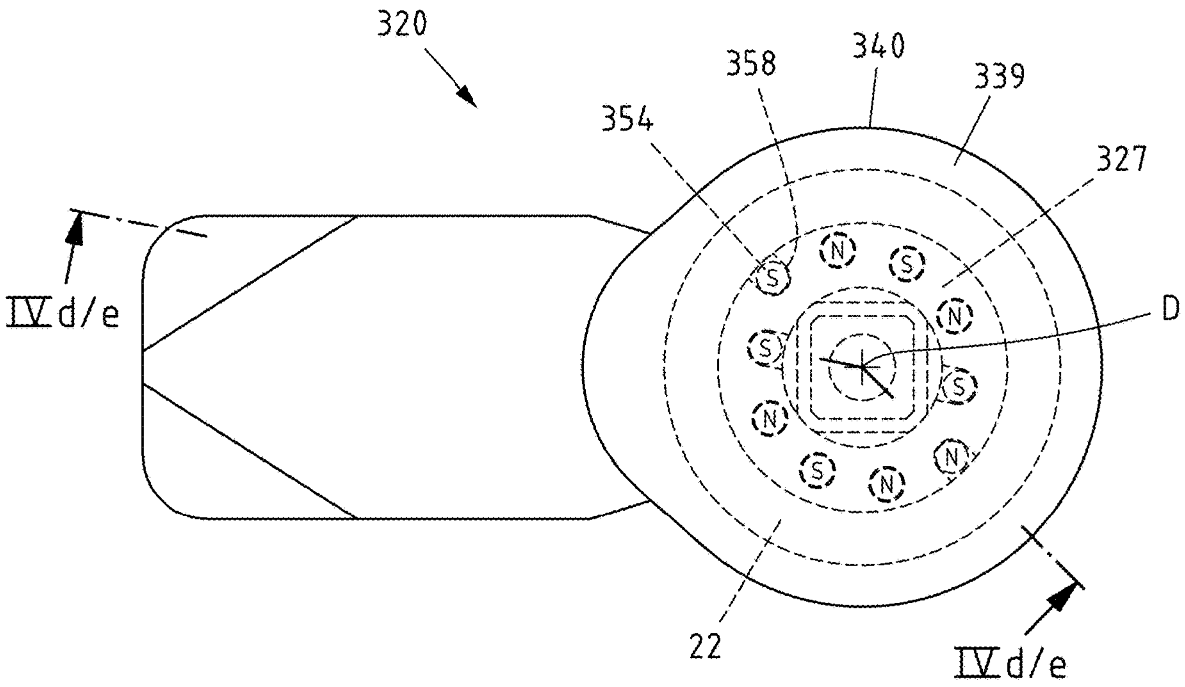
Figure 4D:
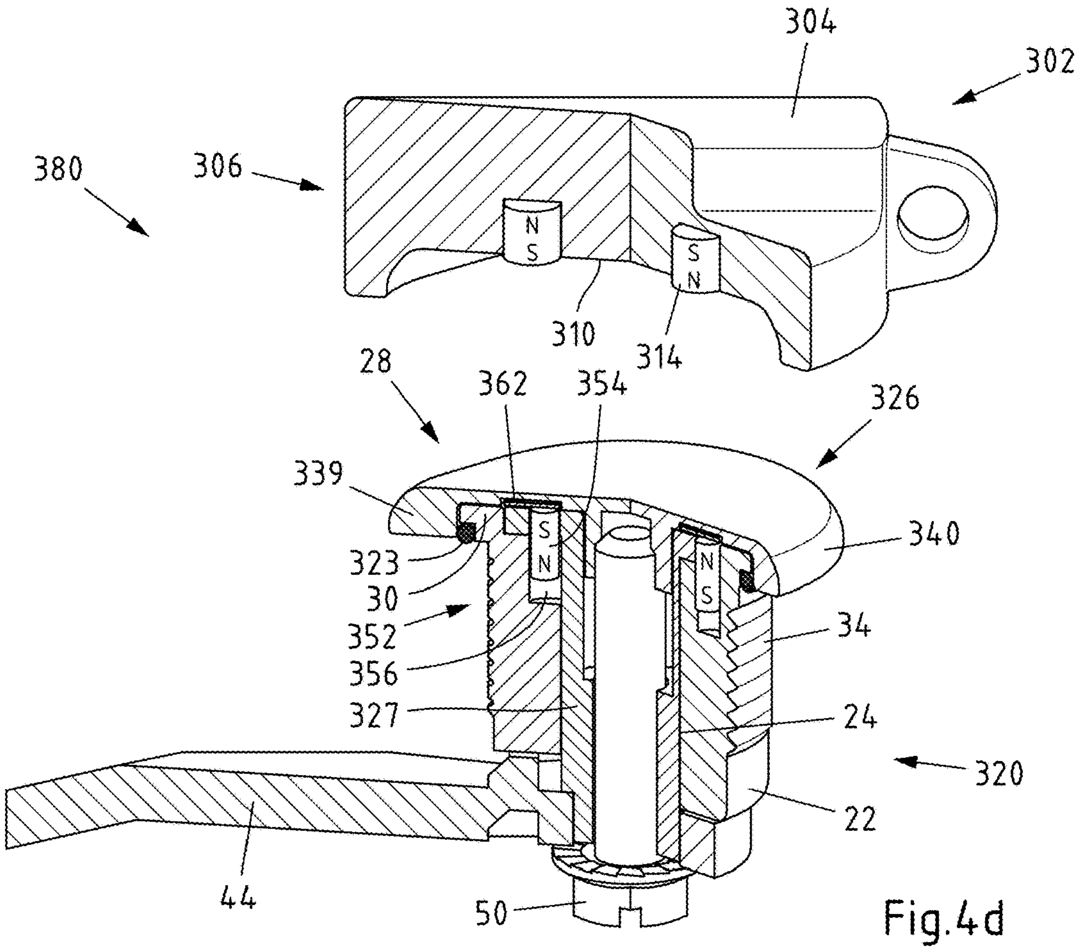
Figure 4E:
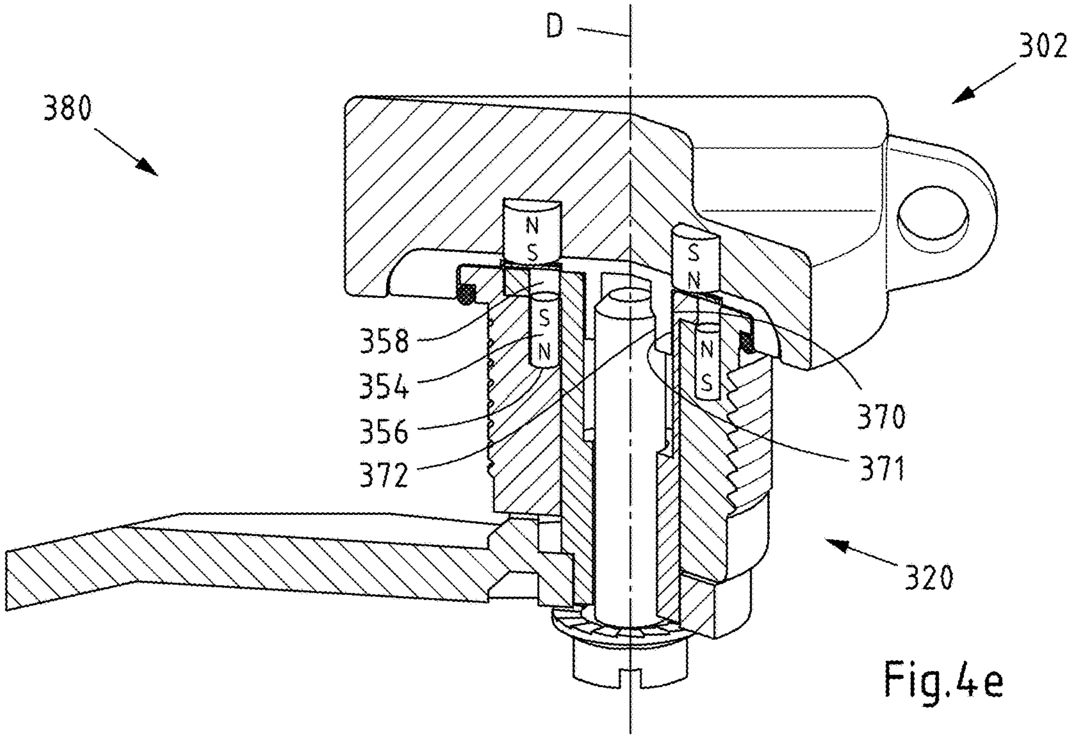

FIGS. 4*a-e* show a fourth exemplary embodiment of the lock, the key and the lock system. FIG. 4*a* shows the key 302 and the lock 320 in a perspective view from diagonally below and diagonally from the back, respectively. FIG. 4*b* shows the key 302 in a view from below. FIG. 4*c* shows the lock 320 in a top view onto the lock contour. FIGS. 4*d-e* show the key 302 and the lock 320 in three-quarter sectional view corresponding to the sectional planes labelled "IVd/e" in FIGS. 4*b-c*, namely before the key 302 is mounted (FIG. 4*d*) and after the key 302 is mounted (FIG. 4*e*).

The key 302 and the lock 320 together form a lock system 380.

The lock 320 basically has a similar structure to the lock 20 in FIGS. 1*a-g*. In this respect, reference is made to the above explanations regarding FIGS. 1*a-g*. Corresponding components are partially provided with the same reference numerals, even if they may be designed differently in FIGS. 1*a-g* and FIGS. 4*a-e*.

The lock 320 differs from the lock 20 in that the lock core 326 has, at the first end accessible from the front side 28 of the lock 320, a contour part 339 which preferably projects laterally beyond the collar 30 of the lock housing 22 and has a lock contour 340, which in the present case is formed as an outer contour.

During installation in an opening in a thin wall, the collar 30 of the lock housing 22 forms an abutment surface on one side of the thin wall. From the other side of the thin wall, a nut can be screwed onto the external thread 34 to secure the lock in the opening.

The key 302 has a socket part 306 with a key contour 308 in the form of an inner contour adapted to the lock contour 340. A plurality of magnets 314 with a predetermined position and pole orientation are arranged in a recessed surface 310 surrounded by the key contour 308, which magnets form a magnet arrangement 312. In the key 302, the handle part 304 is formed by a handling contour arranged on the rear side of the attachment part 306.

In the present lock 320, the lock core 326 is designed as multiple parts with the contour part 339 and a core part 327 arranged in the inner channel 24 of the lock housing 22, wherein the contour part 339 and core part 327 are connected to one another in a rotationally fixed manner. For this purpose, the contour part 339 in the present exemplary embodiment has an outer contour 370 and the core part 327 has a corresponding inner contour 371, for example a polygonal contour, which interlock in a form-fit manner. In the present exemplary embodiment, the contour part 339 is also connected to the core part 327 in that the screw 50 guided through the core part 327 is screwed into an internal thread 372 on the contour part 339. The multi-part design of the lock core 326 with separate contour part 339 allows to select a contour part from a number of different contour parts if required.

Alternatively, the contour part 339 and core part 327 may also be formed in one piece.

As shown in FIG. 4*d*, a circumferential seal 323, for example an O-ring, may be provided on the collar 30 of the lock housing 22, preferably adjacent to the core part 327, which seal seals the lock housing 22 towards the wall and can also prevent moisture from penetrating between the lock housing 22 and the core part 327.

The blocking means 352 of the sash lock 320 comprise a plurality of blocking elements 354, which are displaceably mounted in respective edge-sided receptacles 356 of the lock housing 22. The blocking elements 354 can be displaced in the respective receptacles 356 between a blocking position (see FIG. 4*d*) and a release position (see FIG. 4*e*). In the blocking position (FIG. 4*d*), the blocking elements 354 engage in respective recesses 358 of the lock core 326 and thereby, in a form-fit manner, block rotation of the lock core 326 in the lock housing 22 between the open position and the closed position. In the release position (FIG. 4*e*), the blocking elements 354 are retracted into the receptacle 356 and do not engage in the recesses 358, so that the blocking elements 354 release the rotation of the lock core 326 in the lock housing between the open position and the closed position.

The blocking elements 354 are designed as magnets whose position and pole direction are adapted to the magnet arrangement 312 of the key 302 in such a way that the blocking elements 354 are moved into the release position when the key 302 is mounted (FIG. 4*d*). For this purpose, the blocking elements 354, which are designed as magnets, and the magnets 314 of the magnet arrangement 312 are arranged and aligned in particular in such a way that each blocking element 354 is opposed by a respective magnet 314 of the magnet arrangement 314 with antiparallel pole alignment when the key 302 is mounted, so that a force acts on the blocking element 354 which moves the blocking element 354 into the release position. Furthermore, retaining elements 362 in the form of ferromagnetic elements are provided in the lock core 326, in the present example in the contour part 339 of the lock core 326, which retaining elements, when the key 302 is not mounted, hold the blocking elements 354 in the blocking position (FIG. 4*c*). The magnets 314 and blocking elements 354 are adapted such that the holding force between the retaining element 362 and the respective blocking element 354 is overcome by the repulsive force between the magnet 314 and the respective blocking element 354 when the key 302 is mounted.

The lock contour 340 and the key contour 308 are asymmetrical in the present example, so that the key contour 308 can only be placed on the lock contour 308 in a predetermined orientation. With the—in the present example—ten blocking elements 354 designed as magnets and correspondingly ten magnets 314 of the magnet arrangement 312, this results in $2^{10}$=1024 different possible combinations for the pole directions of the magnets.

The pole orientations of the individual magnets 314 and of the blocking elements 354, respectively, are partially marked in the figures with "N" (magnetic north pole) and "S" (magnetic south pole).

In the present example, the receptacles 356 and associated recesses 358 for the multiple blocking elements 354 also have different distances from the axis of rotation D of the lock core 326 (see FIG. 4*c*). In this way, it is prevented that, during or after the swiveling of the lock core 326, in particular out of the closed position, a blocking element 354 can move into another receptacle 356 and thus into a blocking position which could block the rotation of the lock core 326, for example back into the closed position. As a result, the lock core 326 can, for example, be moved freely into the closed position, since the blocking elements 354 can only return to the closed position in their respective receptacles 356 when the key 302 is removed.

Due to the different distance of the receptacles 356 from the axis of rotation D of the lock core 326, the number of possible combinations for the magnet arrangement 312 may also be increased, for example, since in addition to the pole direction of the individual magnets 314, different radial positions in relation to the axis of rotation D of the lock core 326 may also be selected for the individual magnets 314. For this purpose, the magnetic force of the blocking elements 354 and the magnets 314 is preferably adjusted such that a blocking element 354 is only moved into the respective release position if the associated magnet 314 is positioned at a predetermined distance from the axis of rotation D.

Figure 5A:
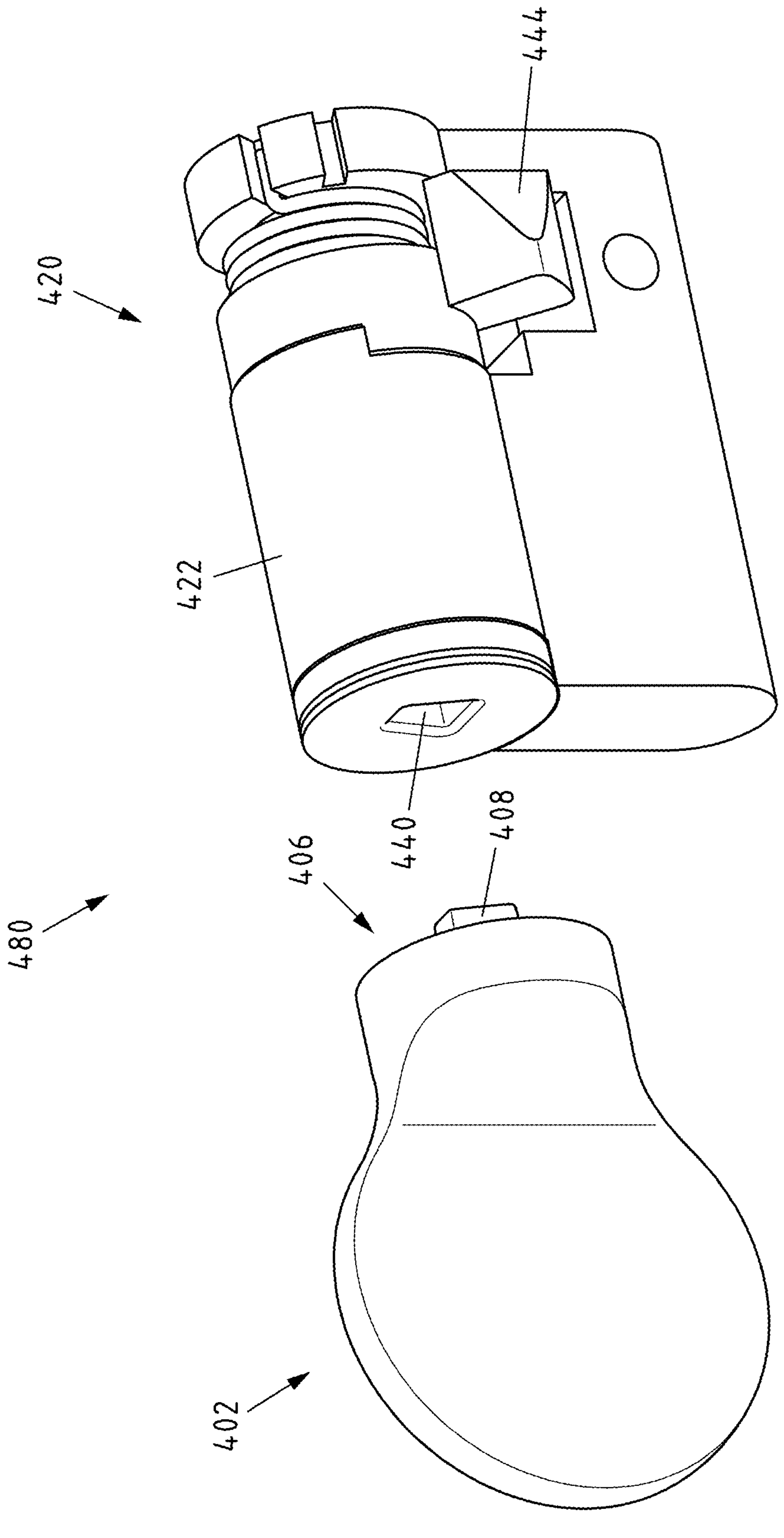
FIGS. 5*a-e* show a fifth exemplary embodiment of the lock, the key and the lock system.
Figure 5B:
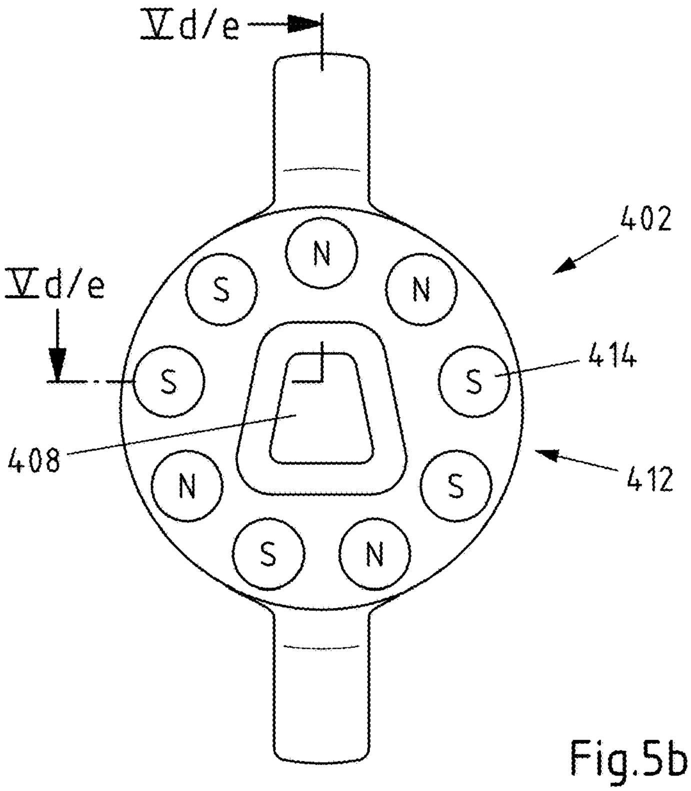
Figure 5C:
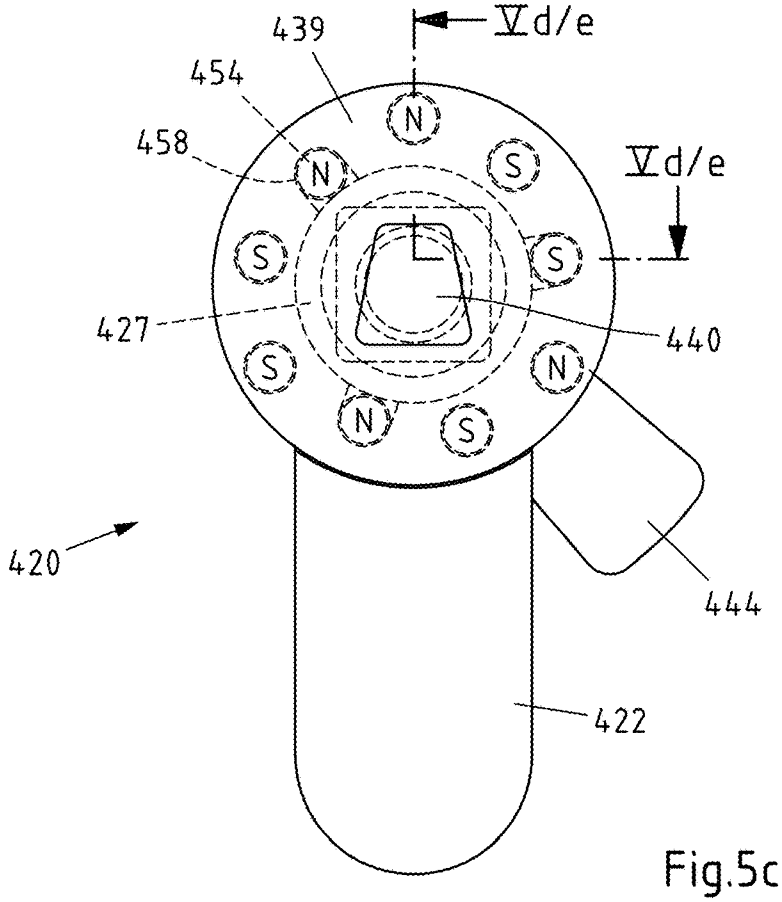
Figure 5D:
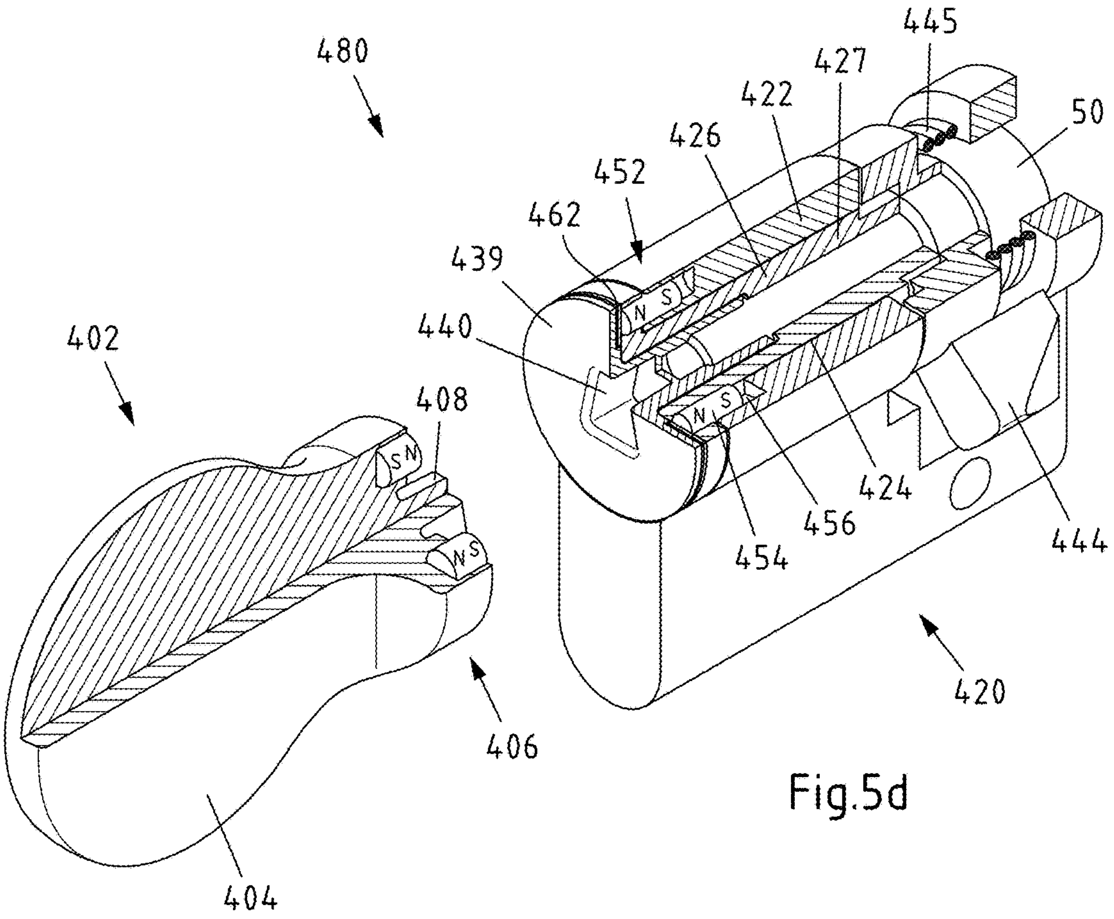
Figure 5E:
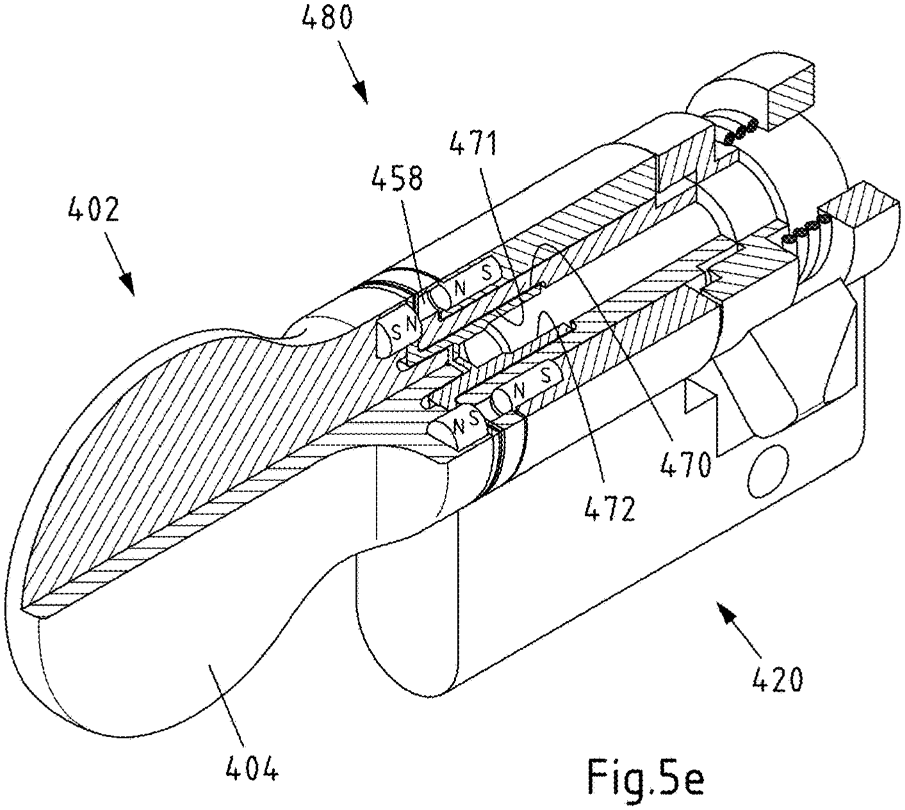

FIGS. 5*a-e* show a fifth embodiment example of the lock, the key and the lock system. FIG. 5*a* shows the key 402 and the lock 420 in perspective view. FIG. 5*b* shows the key 402 in a plan view from the front of the key contour. FIG. 5*c* shows the lock 420 in a top view onto the lock contour. FIGS. 5*d-e* show the key 402 and the lock 420 in three-quarter sectional view corresponding to the sectional planes labelled "Vd/e" in FIGS. 5*b-c*, namely before the key 402 is mounted (FIG. 5*d*) and after the key 402 is mounted (FIG. 5*e*).

The key 402 and the lock 420 together form a lock system 480.

The lock 420 basically has a similar internal structure to the lock 20 in FIGS. 1*a-g*. In this respect, reference is made to the above explanations regarding FIGS. 1*a-g*. Corresponding components are partially provided with the same reference numerals, even if they may be designed differently in FIGS. 1*a-g* and FIGS. 4*a-e*.

The lock 420 differs from the lock 20 in that the lock 420 is not designed as a sash lock, but in the form of a profiled cylinder with a locking lug 444 which is connected to the lock core 426 in a rotationally fixed manner and which, as shown in FIG. 4*a*, can optionally be held in a predetermined position by a spring 445 when the lock 420 is not actuated. In the present case, the lock housing 422 has the shape of a profile cylinder, so that the lock 420 can be used instead of a conventional cylinder lock.

At the first end accessible from the front side 28 of the lock 420, the lock core 426 has a lock contour 440, which in the present case is formed as an inner contour, for example as a square recess. Accordingly, the key 402 has an attachment part 406 with a key contour 408 adapted to the lock contour 440 in the form of a protruding outer contour. Alternatively, the lock contour 440 could also be formed as an outer contour, for example as a square projection, and the key contour 408 could be formed as an inner contour, for example a square inner contour.

The blocking means 452 of the sash lock 420 comprise a plurality of blocking elements 454 in the form of magnets, which are displaceably mounted in respective edge-sided receptacles 456 of the lock housing 422. The blocking elements 454 can be displaced in the respective receptacles 456 between a blocking position (see FIG. 5*d*), in which the blocking elements 454 engage in respective recesses 458 of the lock core, and a release position (FIG. 5*e*), into which, when mounting the key 402 with adapted magnet arrangement 412, the blocking elements 454 are moved and release the rotation of the lock core 426 in the lock housing 422.

In the present exemplary embodiment, the lock core 426 is formed in two parts with a core part 427 arranged in the inner channel 424 of the lock housing 422 and a contour part 439 with the lock contour 440. The core part 427 and the contour part 439 are connected to each other in a rotationally fixed manner in that an outer contour 470 of the core part engages positively in an inner contour 471 of the contour part 439 and the screw 50 is screwed through the core part 427 into an internal thread 472 in the contour part 439.

The lock contour 440 and the key contour 408 are asymmetrical, so that the key 402 can only be placed on the lock contour 440 in a predetermined orientation. With the blocking means 452, which in the present example comprise nine blocking elements 454 designed as magnets, and correspondingly nine magnets 414 of the magnet arrangement 412, this results in $2^{9}$=512 different possible combinations for the pole directions of the magnets.

The pole orientations of the individual magnets 414 or the blocking elements 454 are partially marked in the figures with "N" (magnetic north pole) and "S" (magnetic south pole).

As with the lock 320, in the lock 420, the receptacles 456 and associated recesses 458 for the blocking elements 454 also have different distances from the axis of rotation of the lock core 426 (see FIG. 5*c*) in order to prevent, when the lock core 426 is swiveled, a blocking element 454 from moving into another receptacle 456 and thus into a blocking position, which could block the rotation of the lock core 426, for example back to the initial position.

In the lock 420, the retaining element 462 is formed as a ring-shaped sheet of ferromagnetic metal, which is inserted into the core part 439.

LIST OF REFERENCE NUMERALS

2, 102, 202, 302, 402 key
4, 104, 204, 304, 404 handle part
6, 106, 206, 306, 406 attachment part
8, 108, 208, 308, 408 key contour
10 collar of the attachment part
12, 112, 212, 312, 412 magnet arrangement
14, 114, 214, 215, 314, 414 magnet
16 marking
20, 120, 220, 320, 420 lock
22, 122, 222, 422 lock housing
24, 124, 224, 424 inner channel
26, 126, 226, 326, 426 lock core
28, 128, 228 front side
30, 130, 230 collar of the lock housing
32, 132, 232 housing body
34, 134, 234 external thread
36 nut
38, 138, 238 first end of the lock core
40, 140, 240, 340, 440 lock contour
42, 142, 242 second end of the lock core
44, 144, 244 rotating tongue
46, 48, 146, 148, 246, 248 corresponding contours
50, 150, 250 screw
52, 152, 252, 352, 452 blocking means
54, 154, 254, 255, 354, 454 blocking element
56, 156, 256, 257, 356, 456 receptacle
58, 259 recess
60 shaped element
62, 162, 262, 263, 362, 462 retaining element
63 opening
64 frontside
66 marking
67, 167, 267, 268 abutment surface
68, 168, 269 abutment surface arrangement
80, 180, 280, 380, 480 lock system
90 opening
92 sheet metal door
94 blocking surface
96 frame
109 blind bore
154*a*, 254*a*, 255*a* steel pin
154*b*, 254*b*, 255*b* magnet
156*a* first part of the receptacle 156
156*b* second part of the receptacle 156
164 side face
209 projection
210 surface
211 surface
241 recess
255*c-d* slide
256*a* first part of the receptacle 256
256 second part of the receptacle 256
257*a* axial part of the receptacle 257
257*b* radial part of the receptacle 257
264, 265 inclined surface
266 magnet
310 surface
323 seal
327, 427 core part
339, 439 contour part
358, 458 recess
370, 470 outer contour of the contour part
371, 471 inner contour of the core part
372, 472 internal thread of the contour part
444 locking lug
445 spring
A, B, C, D rotary axis

The invention claimed is:

1. A lock, in particular sash lock, comprising:
a lock housing and
a lock core rotatably mounted in the lock housing,
wherein the lock core, at a first end accessible from a front side of the lock, is formed for torque-transmitting attachment of a key, in particular a socket key, and
wherein the lock has blocking means, which, when the key is removed, block rotation of the lock core in the lock housing between an open position and a closed position,
wherein the blocking means are configured to release the rotation of the lock core in the lock housing between the open position and the closed position when a key, in particular a socket key, with a predetermined magnet arrangement is mounted on the first end of the lock core,
wherein the lock core has a contour part with a lock contour, wherein the contour part projects laterally beyond the lock housing at the first end and wherein the contour part is flat and is delimited by an outer contour on the edge, which outer contour forms the lock contour.

2. The lock according to claim 1, wherein
the predetermined magnet arrangement comprises a predetermined number of magnets each having a predetermined position.

3. The lock according to claim 1, wherein
the predetermined magnet arrangement comprises a predetermined number of magnets each having a predetermined position and a predetermined pole orientation.

4. The lock according to claim 1, wherein
the blocking means comprise a blocking element which is mounted displaceably between a blocking position, in which the blocking element blocks the rotation of the lock core in the lock housing between the open position and the closed position, and a release position, in which the blocking element releases the rotation of the lock core in the lock housing between the open position and the closed position.

5. The lock according to claim 4, wherein
the lock core and/or the lock housing has a receptacle in which the blocking element is displaceably mounted.

6. The lock according to claim 4, wherein
the blocking means comprise a plurality of blocking elements, which blocking elements are mounted in respective receptacles in the lock housing and/or in the lock core, the receptacles being arranged around the axis of rotation of the lock core, and which blocking elements in the blocking position engage in a respective associated recess in the lock core and/or locking housing, wherein preferably at least two, in particular all, of the receptacles arranged around the axis of rotation of the lock core and/or associated recesses having different distances from the axis of rotation of the lock core.

7. The lock according to claim 4, wherein
the lock has a retaining element which is configured to retain, when the key is removed, the blocking element in the closed position by magnetic interaction, in particular between the retaining element and the blocking element.

8. The lock according to claim 4, wherein the blocking element is configured to be moved into the release position when a key with the predetermined magnet arrangement is attached onto the first end of the lock core, namely by magnetic interaction, in particular magnetic repulsion, between the blocking element and the magnet arrangement.

9. The lock according to claim 4, wherein the blocking element is a magnet or comprises a magnet.

10. The lock according to claim 1, wherein the lock has an abutment surface arrangement for abutment of the predetermined magnet arrangement and the blocking means are arranged and configured in such a way that the blocking means release the rotation of the lock core in the lock housing between the open position and the closed position when the predetermined magnet arrangement comes into contact with the abutment surface arrangement.

11. The lock according to claim 10, wherein the abutment surface arrangement is arranged completely or at least partially separately from the lock contour, for example offset radially outwards or inwards in relation to the axis of rotation (A, B, C, D) of the lock core.

12. The lock according to claim 11, wherein the lock core is formed as multiple parts and has a core part arranged in the inner channel of the lock housing and a contour part with the lock contour, the core part and the contour part being connected to one another in a rotationally fixed manner.

13. The lock according to claim 12, wherein the lock housing is formed in the shape of a profile cylinder.

14. A key preferably socket key, in particular for a lock according to claim 13, comprising a handle part and an attachment part wherein the attachment part has a key contour, in particular a polygonal contour, for torque-transmitting attachment to a lock core of a lock, wherein the key has a magnet arrangement on the attachment part, wherein the key has an inner contour that defines a flat area in which the magnet arrangement is arranged.

15. The key according to claim 14, wherein the magnet arrangement comprises one or more magnets arranged at a respective position, preferably at least two magnets having different pole orientations.

16. The key according to claim 14, wherein the magnet arrangement is arranged at least partially separately from the key contour and/or at least partially on the key contour.

17. The key according to claim 14, wherein the key has a wall thickness of at least 4 mm.

18. The lock system, in particular sash lock system, with a lock according to claim 1 and with a key matching the lock.

* * * * *